United States Patent [19]

Geuens et al.

[11] 3,931,471

[45] Jan. 6, 1976

[54] ELECTRONIC METERING ARRANGEMENT FOR USE IN TELEPHONE AND LIKE EXCHANGES

[75] Inventors: Leopold Laurens Coletta Geuens, Herenthout; Willy Francisca Van Hoeck, Boom, both of Belgium

[73] Assignee: GTE International Incorporated, Stamford, Conn.

[22] Filed: Apr. 1, 1974

[21] Appl. No.: 456,673

[30] Foreign Application Priority Data
Mar. 30, 1973 United Kingdom............... 15571/73

[52] U.S. Cl. .......................................... 179/7 MM
[51] Int. Cl.² ...................................... H04M 15/10
[58] Field of Search..... 179/7 R, 7 MM, 8 R, 7.1 R, 179/7.1 TP

[56] References Cited
UNITED STATES PATENTS

| | | |
|---|---|---|
| 3,107,271 | 10/1963 | Marwing et al................. 179/7 MM |
| 3,433,898 | 3/1969 | Sellenslagh et al............. 179/7 MM |
| 3,697,695 | 10/1972 | Pommerening et al......... 179/7 MM |
| 3,825,689 | 7/1974 | Baichtal et al...................... 179/7 R |

*Primary Examiner*—Kathleen H. Claffy
*Assistant Examiner*—Gerald L. Brigance

[57] ABSTRACT

A time and zone metering system wherein a central store is used to accumulate the metering pulse total for each line. The central store consists of a magnetic disc with which a line scanner is synchronized. Each line is equipped with a pulse plus bias line gate that is also wired into a gating arrangement with the timing pulses, so that a combination of the allotted time by the scanner and the presence of a metering pulse is effective to cause a temporary record to be made. Included in the system is a timing means to verify the authenticity of the metering pulses. After storage of the metering marks in the temporary store other logic is effective to place the marks in the stores reserved for a particular line.

3 Claims, 14 Drawing Figures

3,931,471

ELECTRONIC METERING ARRANGEMENT FOR USE IN TELEPHONE AND LIKE EXCHANGES

BACKGROUND OF THE INVENTION

1. Field of the Invention

This invention relates to telephone or like systems and is more particularly concerned with public telephone systems of the type in which the number of calls completed by a subscriber or the number of unit values represented by such calls is recorded on some type of register device, the information from which is then used as the basis for rendering accounts.

2. Description of the Prior Art

The arrangement almost universally adopted at the present time is to make use of an electromagnetically-operated step-by-step ring counter with four or five decimal positions. Such a counter, which is on a per subscriber basis, makes one or several steps at the beginning of the conversation depending on the distance between the calling and the called parties. For long distance calls, the counter will step during the conversation with a certain frequency depending on the distance between the two parties. This system is known as periodic pulse metering.

Readings of the various counters are made at predetermined intervals, for instance monthly or quarterly, and the accounts to the subscribers are made out from the figures thus obtained. The individual reading of the meters and the preparation of the accounts is a tedious operation, even if some degree of mechanization is used as by photographing them. The picture that is taken of the panel mounted counter is then read and the reading is perforated on cards by an operator; the final bill for the customer is a copy of this card. This major disadvantage of the mechanical counters, caused by the difficulty of reproducing their position for billing the customer except by the slow and very expensive manual operation, has resulted in the expenditure of much effort to improve the system.

SUMMARY OF THE INVENTION

To alleviate the above problems, telephone exchange electronic metering systems have been proposed in which the call fee meters of existing exchanges are replaced by electronic means for the detection, verification and temporary storage of metering signals, there being also provided a semi-permanent storage means common to all the metering signal leads of the exchange, which records the totals of the metering units appertaining to the respective metering signal leads, (subscribers) and which is regularly updated by reading a particular total from the semi-permanent store and adding to it the number of meter pulse signals recorded by the temporary store since the last updating operation. Such arrangements provide the advantage that the meter fee totals can be read out, along with the respective metering signal lead, (subscriber) identities, from the semi-permanent storage means to an associated data processing means which can be arranged to produce the respective subscriber telephone bills, or other metering data, in a substantially wholly automatic number. Such a system is disclosed in U.S. Pat. No. 3,433,898. However, where the means for the detection, verification and temporary storage comprise discrete elements individually associated with the respective metering signal leads, the arrangements tend to become cumbersome, expensive and difficult to maintain, especially for the larger exchange sizes serving 10,000 lines, or more.

Consequently, a preferred electronic metering system of the kind outlined above has evolved in which the meter signal verification as well as both the temporary and semi-permanent stores are constituted by a single dynamic storage means common to all the metering signal leads of the exchange. With such arrangements, only a simple line interrogating gate is required to be provided individual to each metering signal lead of the exchange while the logic associated with the dynamic storage means may employ integrated circuit elements resulting in a realization of the apparatus which is compact and economical.

The object of the present invention is to provide an improved electronic metering system for telephone or like exchanges of the kind outlined above and employing a dynamic storage means common to all the metering signal leads of the exchange.

According to the present invention there is provided a telephone exchange electronic metering system, wherein metering data is derived from the metering signal leads of the exchange and is recorded by a dynamic storage means common to all the metering signal leads, the metering data being derived by the successive and cyclic interrogation of the metering signal leads and the dynamic storage means being arranged to provide a temporary storage part for the storage of metering data resulting from metering signal lead interrogations and a semi-permanent storage part in which the totals of the metering units appertaining to each metering signal lead are recorded, each storage part providing at least one storage cell for each metering signal lead and wherein, logic means associated with the temporary part of the dynamic store includes two groups of time delay elements, the first of which serves in association with a first group of temporary storage tracks for the verification of the validity of the metering pulses detected by the interrogation of the metering signal leads and for the recording of the verified metering pulses in respective ones of a second group of temporary storage tracks, while the second group of time delay elements function in association with the second group of temporary storage tracks to present the verified metering pulse(s) appertaining to a particular metering signal lead to updating logic associated with the semi-permanent part of the store, at a time specified with reference to the time of initial interrogation of the respective metering signal lead.

In a preferred embodiment of the invention, the metering signal leads of an exchange are interrogated for the presence or absence of metering pulses by means of line gates of the well known pulse-plus-bias form, one such line gate being provided individual to each metering signal lead, and each line gate having its bias input terminal connected to the associated metering signal lead and its pulse input connected to be driven by clock pulses derived from a clock pulse track of the common dynamic storage means. Also, in the preferred embodiment, the dynamic storage means is of the well known drum or disc type, comprising a number of fixed read/write heads and a common rotary storage part, the latter being constituted by a layer of magnetic material having a substantially rectangular hysteresis loop.

For the verification of meter pulse signals, to distinguish true metering pulses from other spurious signals, and also to ensure that spurious interruptions of metering signals do not result in the same metering signal being recorded twice, a first check is made to ensure that a detected meter pulse signal persists for at least a first predetermined time period, while, subsequent to the detection of the termination of a metering pulse signal a second check is made to ensure that no further pulse signal condition occurs for at least a second predetermined time period. By making both of these time periods correspond to the time of one complete revolution of the dynamic store the verification of the meter pulse signals can be effected by the dynamic store in conjunction with external logic means.

In the preferred arrangement the dynamic store performs four separate functions. These are, the generation of clock pulses which synchronize the system operation, the verification of meter pulses derived by interrogation of the metering signal leads under control of the generated clock pulses, the temporary storage of meter fee units corresponding to the verified meter pulse signals and the semi-permanent storage of the numerical total of the meter fee units accumulated in respect of each metering signal lead, by additions of the verified meter fee units from the temporary part of the store.

For the verification and temporary storage of meter pulse signals the temporary part of the storage means comprises two groups of storage tracks, one containing the pulse verification track the other, containing the verified meter pulse temporary storage tracks. In the preferred arrangement, there are four tracks in the pulse verification group and $2n - 1$ storage tracks in the verified meter pulse temporary storage group, the latter serving the storage of $n$ verified meter pulses.

In operation of the preferred arrangement, while the temporary storage part of the store is accepting and recording metering data in synchronism with the interrogation of the metering signal leads, the logic associated with the semi-permanent part of the store deals with individual requests for updating, and each updating operation occupies the logic associated with the semi-permanent part of the store for a time period, approximately 35 m.s. which is in excess of two complete revolutions of the store. Thus, in periods of heavy telephone traffic and where some form of multi-fee metering is employed, it may be necessary for a number of verified meter pulses to be temporarily stored in the temporary part of the storage means in respect of a particular metering signal lead (subscriber) before the updating logic associated with the semi-permanent part of the store can respond to a request for updating in respect of that subscriber. In the preferred embodiment of this invention provision is made for the temporary storage of up to ten verified meter pulses, for which a total of 19 temporary storage tracks are provided.

In carrying out the functions of line interrogation, pulse verification and temporary storage, progressive time delays occur. Thus, relative to the reference address time slot appertaining to a particular metering signal lead the respective items of metering data appertaining to this metering signal lead are recorded in different temporary storage tracks of the dynamic store, in cell positions which are progressively displaced from the reference address position and from one another, the displacement from the reference position building up to a maximum of 55 cell positions ( = 55 time slots) in the case where ten verified meter pulse signals are recorded in the temporary part of the store. To cater for these time shifts, the logic associated with the temporary part of the store incorporates two groups of time delay elements, one group being associated with the pulse verification tracks and the other with the meter pulse temporary storage tracks. In the preferred embodiment each time delay element takes the form of a one-bit shift register, the first group comprising three shift registers and the second group comprising up to ten shift registers. The three shift registers in the first group provide output tappings along their lengths, so that an applied input signal will appear over the respective output tappings after the elapse of progressively increasing time intervals, these output signals being effective in conjunction with the meter pulse verification tracks, for effecting meter pulse verification, and also being effective for scanning the meter pulse temporary storage tracks to determine the first temporary storage track in which the respective storage cell is free to accept a meter pulse signal. The 10 shift registers of the second group are respectively associated with the read/write heads of the verified meter pulse temporary storage tracks, and each has a number of shift register positions which complements the time displacements, relative to the reference address time slot of the signals it is connected to receive, to a total of 55 time slots, so that information read-out from these temporary storage tracks in progressively displaced time slots appear at the outputs from their respective shift registers in time alignment in a time slot which has a specified relationship to the reference time slot for the metering signal lead address concerned.

The semi-permanent part of the store comprises a total of 22 storage tracks, of which 20 are numerical tracks, which serve to store the accumulated meter fee totals, up to a maximum of 99,999 meter fee units, in respect of each metering signal lead served, while of the remaining two tracks, one serves to record a parity check bit against each meter fee total, while the other serves to record a read-out control data bit, the system being arranged so that this latter data bit may be re-corded either automatically during respective updating operations, or under manual control from an associated control panel, thereby enabling different read-out facilities to be provided, for example, enabling read-out to be effected in respect of only those meter fee totals which have changed since the previous read-out, or a limited group read-out where it is required to read-out the meter fee records in respect of a particular subscriber number group, or a bulk read-out, in which every meter fee record is read-out, irrespective of any previous read-out operations.

In the semi-permanent part of the store, the corresponding storage cells in each storage track are effectively in line abreast so that in successive storage positions the meter fee data appertaining to respective meter signal lead addresses are read-out together, in parallel code form. However, these storage positions are displaced, with respect to the reference address position appertaining to the respective metering signal leads, by a constant negative (backwards) displacement of 60 storage positions.

To minimize the possibility of overflow of the temporary storage capacity provided, by meter pulse signals appertaining to a particular metering signal lead, the coupling between the temporary part of the store and the updating apparatus associated with the semi-permanent part of the store includes priority means which operates to ensure that where more than one request for updating exists at any time, the updating apparatus is directed to attend to that request which is made in respect of the highest number of temporarily stored meter pulse signals.

BRIEF DESCRIPTION OF THE DRAWING

The invention will be more fully understood from the following description of a proposed electronic metering system given with reference to the attached diagrams, of which:

FIG. 11A illustrates a logic element employed in the updating sequence.

DETAILED DESCRIPTION OF A PREFERRED EMBODIMENT

Figure 1:
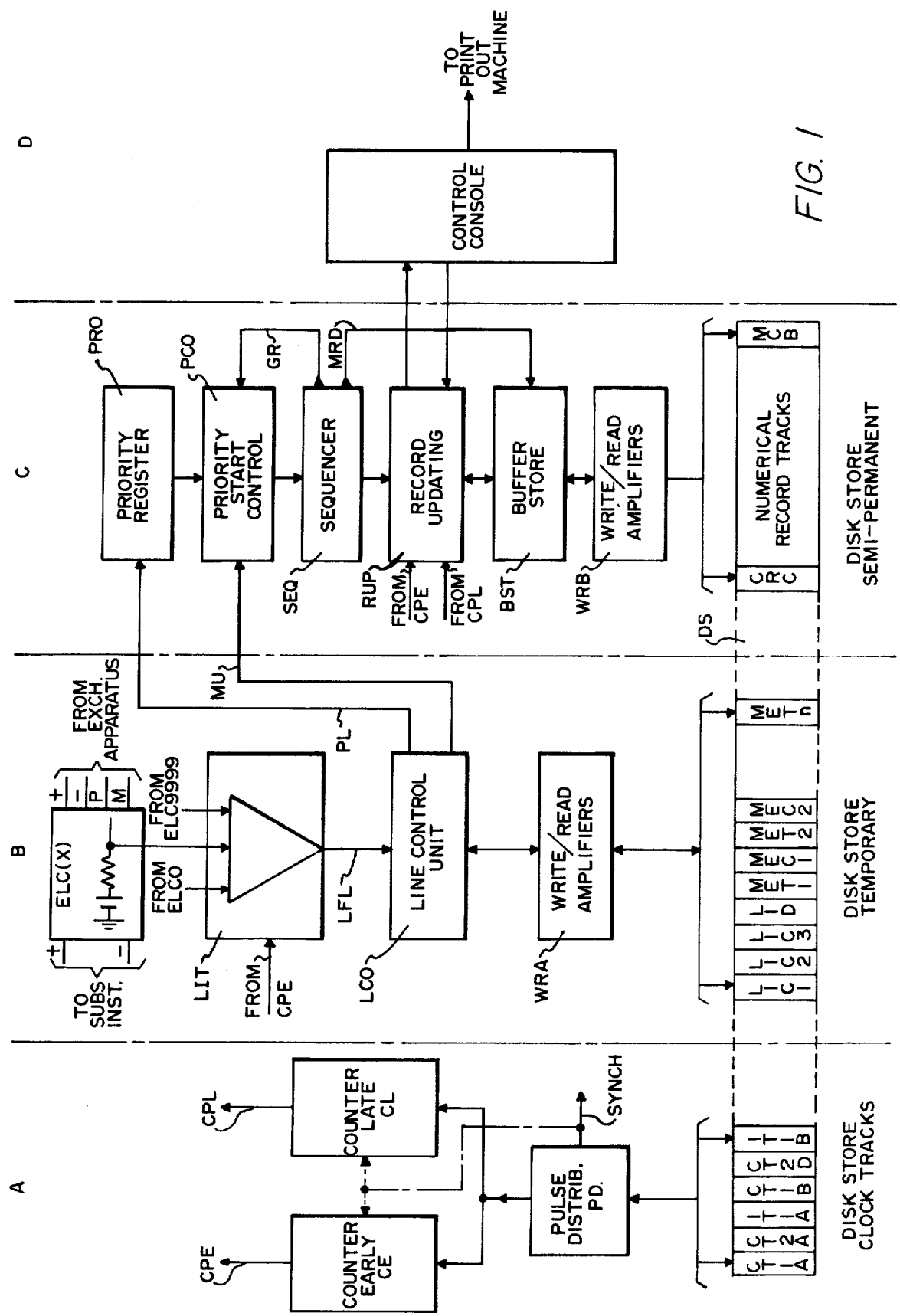
FIG. 1 is a block schematic diagram illustrating in general outline the overall arrangement of the proposed metering system.

Referring firstly to FIG. 1 the metering system there illustrated in general outline may be considered as comprising four main functional apparatus groups designated A, B, C and D. Group A comprises the clock pulse generation and distribution equipment, Group B the metering signal lead interrogation and temporary meterpulse storage equipment, Group C the semipermanent meter fee totals storage and updating equipment and Group D the control panel and print out machine interface equipment. Since the equipment in Group D may take any of a number of known forms, it will not be described in detail, but its main functions will be clear from the description given with reference to the Groups A, B and C.

The system employs a single dynamic store, DS, which in the embodiment being described takes the form of a high capacity magnetic disc memory of a type well known in the computer art and which comprises a flat circular disc arranged to be spun about its central axis by a suitable driving motor. The disc is coated on both its planar surfaces with a hard magnetic oxide layer have a substantially rectangular hysteresis loop. A number of combined read/write heads are arranged in floating association with the planar surfaces of the disc, so that when the disc is in motion, the read/write heads are separated therefrom by a small air-gap, the heads being located over each planar surface so as to define respective rings or tracks concentrically, thereon, as the disc rotates. The write-in and read-out of data to and from the disc store is effected during alternate disc revolutions and in the "write" mode discrete areas or cells of each track are caused to record a bi-polar magnetic flux pattern in response to the application of bi-polar pulses to the respective read/write heads. In the "read" mode, the bianary 1 or 0 significance of the magnetic flux pattern in any storage cell is ascertained by detection of the direction flux change which occurs at the centre of the cell. The disc store employed accommodates 11,500 storage cells along each of its storage tracks. It is a compact and reliable item of apparatus which may be purchased as a component of the system from any of a number of well known suppliers of such apparatus.

In FIG. 1, the disc store is indicated diagrammatically at DS, the storage tracks being represented by the separately designated vertical bands. For the purpose of illustration, the storage tracks are shown divided into groups associated with the respective equipment groups with which they function. Thus, the disc store provides a group of clock pulse tracks which are associated with the pulse distribution and counting equipment group A, a group of storage tracks which serve for meter pulse verification and for the temporary storage of verified meter pulses and which are associated with the metering lead interrogation equipment B and a group of storage tracks which serve to store the meter fee totals appertaining to respective metering signal leads and which are associated with the updating equipment group C.

For the equipment in group A, the disc provides six clock pulse tracks. These operate in two groups of three, one group duplicating the other for security. In FIG. 1, the clock tracks designated CT1A, CT2A and IT1A may be regarded as the primary clock tracks and the clock tracks CT1B, CT2B and IT1B, the corresponding duplicate clock tracks. In each of the clock pulse tracks CT1A, CT2A, CT1B and CT2B, each of the 11,500 storage cells has a binary 1 magnetic pattern permanently recorded therein, and these are read as the disc rotates so as to provide interleaved pulse trains which are applied to the pulse distributor and from which the pulse distributor derives a corresponding pulse train, the pulses of which coincide with the respective disc storage cells, as they are read. These pulses are applied from the pulse distributor to the two address counters CE and CL, which identify the respective storage cells as described in more detail below. The clock pulse tracks IT1A, IT1B are the Indexing or Synchronising tracks and each has a 1 magnetic pattern recorded in only three, adjacent ones of its storage cells, the remaining storage cells being set to the absence of data magnetic condition (i.e., in which no flux change occurs at the centre of each cell). The three adjacent binary 1 pulses read from these tracks constitute a synchronising pattern which the pulse distributor is arranged to recognise and, in response thereto, to provide an output synchronising pulse which marks the start of each disc revolution. These synchronising pulses are also applied to the address counters CE and CL to cause these to be set to their respective start positions — at the start of each disc revolution.

The two counting elements CE and CL serve, respectively, to count the metering signal lead (line) addresses as they are interrogated and the disc store addresses at which the corresponding meter fee record is stored. The metering signal leads are interrogated, in step with the clock pulses derived from the disc store clock tracks under control of the counter CE, termed the "Counter Early." This counter is synchronised to start its count from its zero (00000) position under control of the synchronising pulse marking the start of a disc revolution. However, as further explained in more detail below, delays incurred in the processing of metering data derived from the metering signal lead interrogation result in a time disparity between the time of interrogation of a metering signal lead and the metering record storage cells appertaining to that metering signal lead becoming accessible beneath the read/write heads of the semi-permanent part of the store. In the system being described this time delay is rounded up to a constant delay equivalent to the passage of 60 storage cell positions of the disc store. The counter CL, termed the "Counter Late" is provided to generate the line address identity as its meter record becomes accessible under the read/write heads of the semi-permanent part of the store. Thus, while the counter late is driven from the same clock pulses as the counter early, it is arranged to start its count from a counting position $n - 60$ where $n$ is the zero counting position of the counter early.

Both counting chains have a counting capacity of 99,999, but are arranged so that when the counter early is stepped to position 11,499 and the counter late to position 11,439 (i.e., 60 positions behind the counter early) the synchronising pulse is received, which re-sets the counter early to position 00000 and the counter late to position 99,940. Thus when the disc has rotated a further 60 cell spaces the counter early will be generating address No. 000,60, indicating that line No. 000,60 is being interrogated, while the counter late will have stepped to position 00000, indicating that the metering record store for line address 00000 is now under the read/write heads of the semi-permanent part of the store.

The basic system is arranged to deal with up to 10,500 metering (line) addresses, the counter positions 00000 to 09,999 serve to represent the 10,000 directory numbers of a conventional 10,000 line exchange, while the final 500 positions (counting positions 10,000 to 10,499) are available for use with up to 500 unnumbered exchange lines, where such exist. Counting positions 10,500 to 11,499 on the counter early are not available as metering signal lead addresses, so that the disparity occasioned by resetting the counter late to a starting count of 999,40 as described above is without effect on the system operation.

For exchanges of less than 10,000 line capacity a strapping field, not shown, may be associated with the clock pulse counters, whereby line interrogation may commence from any number and finish on any number. For example on an exchange with, say, 7,000 subscriber lines the line interrogation cycle may start at address 1,000 and finish on address 7,999. For exchanges of greater than 10,000 line capacity, basic system units may be combined to serve exchanges of up to 70,000 line capacity, with each basic system unit serving a subgroup of up to 10,000 lines.

Still referring to FIG. 1, for the equipment in group B, the temporary part of the disc store comprises a total of 23 storage tracks with their associated read/write heads. Four of these tracks, designated LIC1, LIC2, LIC3 and LID in FIG. 1, are used in conjunction with external logic to verify that the pulse conditions, detected by interrogation of the metering signal leads, satisfy minimum time dimensions, both as to the persistence of the detected pulse condition and to the separation between pulses, specified as requisite for the recognition of a detected metering signal lead pulse condition as a valid meter pulse signal. The remaining tracks, designated MET1, MET2, MEC2 ...... up to MET 10, are used for the temporary storage of the verified metering pulses, stored as separate meter fee units in respective ones of the MET/MEC tracks, as explained in more detail below, pending the availability of the group C updating equipment to carry out the updating of the respective meter fee total in respect of the temporarily stored meter fee unit or units.

The equipment in group B comprises essentially, a matrix arrangement of line interrogation gates, designated LIT, a so-called line control element, designated LCO and the buffer amplifiers WRA which interface the line control element and the read/write heads associated with the temporary storage tracks of the disc. The arrangement of the line interrogation gates and of the line control element is described in more detail below, with reference to FIGS. 2 – 6 of the drawings. The read/write buffer amplifiers may be of any well known form and are therefore not described in detail.

In general, each line interrogation gate in the matrix arrangement LIT, has one input connected to receive a priming input from the metering signal lead belonging to a particular subscriber line, for example, from the metering signal lead "M" of the exchange line circuit indicated for explanatory purposes at ELC(x) and a second input which is derived from the clock pulse counter early, as indicated at CE. In operation, upon the occurrence of a pulse condition, on a metering signal lead, the associated line interrogation gate is primed and when this gate is interrogated by the respective drive pulse from CE, the gate opens and, in the manner described in more detail below, causes a corresponding signal to be applied to the line control element over the signal lead LFL. The line interrogation gates may readily be adapted to function with different line circuit metering arrangements and the system is capable of accurately recording metering pulses having a duration and separation of, at least, 60 milli-seconds, each.

Since the equipment in group B is operating in step with the clock pulse early line scanning pulses and because of the various delays which occur in the system logic, the storage cells in the temporary part of the store appertaining to a particular metering signal lead cannot occupy corresponding positions in the various temporary storage tracks, but are regularly displaced from one another in the different tracks. One function of the line control element is to provide for the delaying of the signals applied to it so that these can be correctly recorded in the temporary part of the disc store and so that the signal indicating the presence of one or more meter fee units in the temporary part of the store shall be passed to the updating equipment in group C in respect of a particular metering signal lead in a time slot specified with reference to the time of initial interrogation of that metering signal lead.

Another function of the line control element is the verification of the validity of the metering pullses applied to it over lead LFL. This is effected by a process whereby if an initial pulse condition appears on lead LFL in respect of a particular metering signal lead then, providing the disc store is in the appropriate read/write mode, this pulse is stored in the respective storage cell of the first meter pulse verification track LIC1. (Had the read/write head associated with track LIC1 been in its "read" mode, then this LFL pulse would be ineffective and it is then necessary to await the next interrogation of the meter signal lead during the next disc revolution when the read/write head will have changed to its "write" mode). During the next disc revolution the data bit stored in this storage cell of track LIC1 is read back to the line control element which willl gate this data signal with the LFL signal derived from the second (third) interrogation of the respective metering signal lead. If the second LFL signal indicates that the metering pulse has persisted then the gate will operate to pass a further data signal to the respective storage cell of the second verification track LIC2. The line control element logic now waits until the end of the metering pulse is detected when similar first and second "looks" are carried out to verify that the termination of the pulse has persisted, these actions involving the verification track LID and a respective one of the tracks MET in the temporary part of the disc store with the track LIC3 performing a necessary logic function, as described in more detail below. The method ensures that neither transient pulses nor transient pulse interruptions on the exchange metering signal lead result in incorrect meter fee unit recordings.

When a meter pulse has been verified as outlined above, it is stored in the respective storage cell of the first meter pulse temporary storage track MET1. However, had the respective storage cell of track MET1 already been storing a previously verified meter pulse then the line control element is arranged to, in effect, scan the remaining MET tracks in turn, for the first one in which the storage cell appertaining to the respective metering signal lead is free and to store the verified meter pulse signal in this track. In general the number of MET tracks provided will depend upon the traffic in the exchange concerned and upon the extent of multifee metering involved. In the example being considered provision is made for the temporary storage of up to ten verified meter pulses. Each MET track except the last has an associated buffer track MEC. These are required because of the alternate read/write sequence of operation of the disc heads which is carried out during successive revolutions of the disc. As each meter pulse is recorded in a MET track, a signal is passed from the line control element over one of a group of priority leads, indicated at PL, to register the priority of the respective metering signal lead address for updating by the group C equipment, so that an address requesting updating in respect of say 8 or 9 temporarily stored meter fee units, and in respect of which the temporary storage capacity is in imminent danger of becoming congested, will always have priority over another address whose request for updating is made in respect of only one or two temporarily stored meter fee units. The updating request signal is applied to the group C equipment over one of a group of connecting leads MU, this latter signal being timed with respect to the time of initial interrogation of the respective metering signal lead, as outlined above.

For the group C equipment, the semi-permanent part of the disc store provides a group of numerical record tracks which store the accumulated meter fee totals in respect of each metering signal lead (store) address, as well as two additional tracks, designated MCB and CRC respectively and whose functions are outlined below. Unlike the temporary part of the store, in the semi-permanent part of the store the storage cells appertaining to a particular store (line) address occupy corresponding positions in each track, so that all the storage cells appertaining to a particular address appear beneath the respective read-write heads at the same time, the "read" and "write" operations in respect of these tracks being effected by a parallel mode of operation.

In the system being described, the semi-permanent part of the store accommodates 20 numerical record tracks arranged in five sub-groups each containing four tracks, the data bits stored in each track having a binary code significance such that the pattern of data bits stored in each sub-group determines a decimal digit value in each of five decimal orders. The store thus provides capacity for recording up to 99,999 meter fee units in respect of each store address. The storage track MCB is provided to record the presence or absence of a so-called "parity" bit in association with each meter fee total and is used for checking purposes whenever a meter fee total is staticised in static storage means associated with the updating apparatus. The storage track CRC is provided to record a control data bit which is used in conjunction with the control panel read-out arrangements to enable different read-out facilities to be provided. For example, by inserting a data bit in a respective CRC storage cell when the associated meter fee total is changed, a facility is provided which enables a read-out to be effected in respect of only those addresses whose meter fee totals have been changed since the last read-out, the CRC data bit being cancelled when read-out takes place. Alternatively, CRC data bits may be inserted over selected portions of the CRC track to enable read-out to be effected in respect of a specified 1,000 line group. Similarly a bulk read-out of every store address may be provided irrespective of whether or not the totals stored have changed since the last read-out.

In general, the group C equipment comprises the priority register PRO, the priority start control element PCO, the sequencer SEQ, the record updating apparatus RUP, a buffer storage element BST and the read/write amplifiers WRB.

The priority register PRO serves to record, during each sequence of the read/write revolutions of the disc store, the highest temporary metering track MET($x$) which contains a metering data bit in one or more of its storage cells and to present this information to the priority start control PCO, the information regarding the highest such metering track encountered by the priority register during one sequence of read/write revolutions being presented to the priority start control during the next read/write sequence, and so on.

The priority start control element operates upon receipt of a signal from the sequencer element SEQ indicating that the updating apparatus is at normal and ready to carry out a further updating operation and functions to examine the requests for updating, as indicated to it over the leads MU as the disc rotates, until it encounters the, or the first, request which is made in respect of a number of temporarily stored meter fee units corresponding to the highest number indicated from the priority register, whereupon it passes a start signal to the sequencer SEQ, which then proceeds to carry out the operational routines, resulting in the existing meter fee total for the particular storage address being staticised in the buffer store BST, the transfer of this data to the updating apparatus RUP, the successive addition of the number of meter fee units indicated from the priority start control, the insertion of the new meter fee total into the buffer store and the insertion of this new total into the appropriate storage cells of the numerical record tracks, together with the appropriate CRC and MCB data bits. As previously described, the sequencer performs three separate routines one in each of three successive disc revolutions. The first routine is a meter updating and checking routine, the second, a temporary store re-setting and updated meter fee recording routine and the third, a checking routine to verify that the temporary storage cells appertaining to the address in question have been cleared of the metering data bits in respect of which the updating operation has been carried out and the correct meter fee has been recorded. These sequencer routines, as well as the functioning of the priority register, priority start control and the updating apparatus will be described in more detail with reference to FIGS. 7 - 12 of the attached diagrams.

Figure 2:
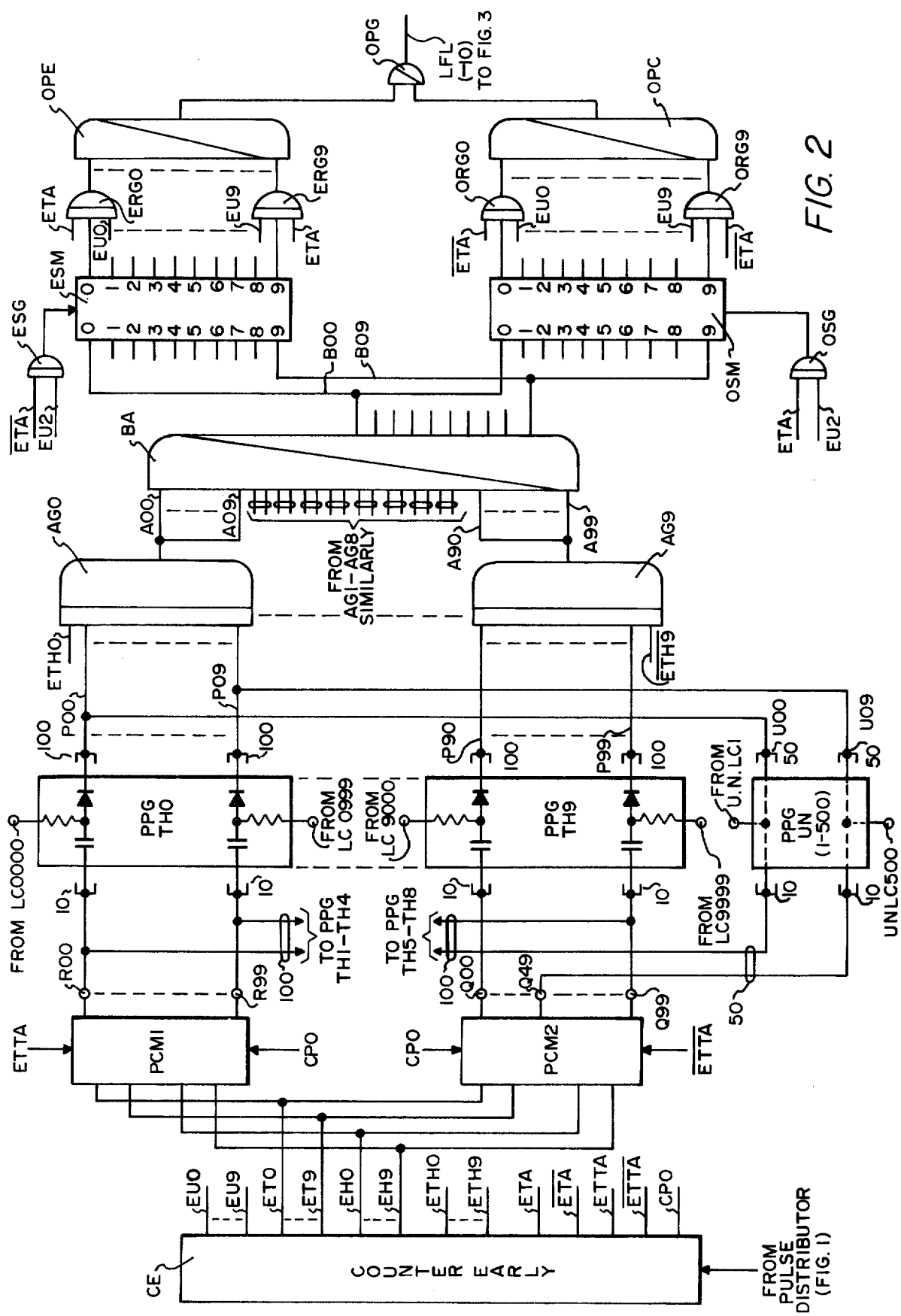
FIG. 2 is a more detailed block schematic diagram of the proposed metering signal lead interrogation arrangements.

Turning now to FIG. 2 of the attached diagrams, this shows in more detail the line interrogation arrangements indicated generally at LIT, FIG. 1. In the arrangement shown, the line interrogation gates are of the well known pulse-plusbias form and are arranged with their drive pulse inputs and gate outputs connected co-ordinately to form a 10 × 100 matrix. For a 10,000 line exchange, there are ten matrices each accommodating 1,000 pulse-plus-bias gates, of which only the two matrices designated PPG/TH0 and PPG/TH9 are shown in the diagram. Additionally, there may be a further half matrix accommodating an additional 500 pulse-plus-bias gates, designated PPG/UN, for use with unnumbered (ex-directory) lines as required. Each pulse-plus-bias gate has its bias input lead connected to the metering signal lead of a respective exchange line circuit as described above with reference to FIG. 1. The matrix designated PPG/TH0 serves the first thousand line circuits numbered 0000 - 0999, while the matrix designated PPG/TH9 serves the last thousand line circuits numbered 9,000 - 9,999, the intervening line circuit groups being served by line gate matrices PPG/TH1 to PPG/TH8, not shown. Each line gate matrix may be visualised an comprising pulse-plus-bias gates in row and column formation, there being 10 gates in each row and 100 gates in each column. The gates in each row have their drive pulse inputs connected in common to a respective one of 100 pulse drive highways, while the gates in each column have their outputs connected in common to a respective one of 10 output highways. The pulse drive inputs to the line gate matrices PPG/TH0 - PPG/TH4 are connected in parallel to the outputs from a first pulse combining matrix PCM1, which the pulse drive inputs to the line gate matrices PPG/TH5 - PPG/TH9 are connected in parallel to the outputs from a second pulse combining matrix PCM2. These pulse combining matrices each provide 100 pulse drive outputs of which two, designated R00 and R99, from matrix PCM1, and two, designated Q00 and Q99, from matrix PCM2, are shown in full. In addition, the fifty pulse drive highways, Q00 to Q49, from PCM2 are also connected to pulse drive inputs to the half line gate matrix PPG/UN.

The clock pulse counter early provides ten output leads for each of the units, tens, hundreds and thousands, orders of counting, as indicated by the outputs EU0 .... EU9 for the units, ET0 .... ET9 for the tens, EH0 .... EH9 for the hundreds and ETH0 .... ETH9 for the thousands. The outputs ETA and $\overline{ETA}$ serve, for a purpose to be described below, respectively to mark the odd and even counts of ten. Output $\overline{ETTA}$ serves the number group 0000 – 4999, while the output ETTA serves to mark the number group 5000 - 10,499, the latter number group including the directory number group 5000 - 9999, plus the unnumbered line addresses 10,000 - 10,499, as described later below. Output CPO is a strobing output signal which occurs during each decade count and extends over the units time periods EU1 and EU2.

The pulse combining matrices PCM1 and PCM2 each comprise a matrix of pulse combining gates which combine the "tens" and "hundreds" output signals from the pulse counter early to provide 100 separate outputs each having a particular tens/hundreds significance, that is, the signals on the first output, R00 from PCM1, or Q00 from PCM2, correspond to the counter early counting positions 000 - 009 in each thousand, the signals on the second output, not shown, correspond to the counting positions 010–019 and so on, the signals on the hundredth output, R99 or Q99 corresponding to the counting positions 990 - 999 in each thousand. Each of these outputs is strobed by the strobing pulse CPO, described above, and the matrices are gated by the respective line group marking signal ETTA or $\overline{ETTA}$, so that the matrices operate alternately, the matrix PCM1 operating in respect of the line gate group 0000 - 4999 and the matrix PCM2 operating in respect of the line gate group 5000 - 9999. (The matrix PCM2 also operates in respect of the half matrix PPG/UN for the unnumbered line addresses 10,000 - 10,499 but we will ignore this for the moment to simplify the explanation).

As previously described, for the line gate addresses 0000 - 4999 each of the 100 pulse drive highways from the combining matrix PCM1 is connected to apply drive pulses to a respective row of 10 pulse-plus-bias gates in each of the line gate matrices PPG/TH0 – PPG/TH4. Thus, for example a drive pulse on the pulse drive highway R00 will be applied simultaneously to the drive inputs to the pulse-plus-bias gates 0000 – 0009, 1000 – 1009, 2000 – 2009, 3000 – 3009 and 4000 – 4009, these gates forming corresponding rows in each of the line gate matrices PPG/TH0 – PPG/TH4. For the line gate addresses 5000 – 9999, the line gates are similarly driven from the pulse combining matrix PCM2. As previously described, each line gate matrix provides 10 output highways, so that as each row of line gates is interrogated, the metering signals produced by the line gates appear simultaneously on respective ones of the ten output highways indicated at P00 – P09 for the line gate matrix PPG/TH0 and at P90 – P99 for the line gate matrix PPG/TH9. For each line gate matrix there is an associated group of 10 amplifier "AND" gates each of which has one input connected to a respective one of the associated line gate matrix outputs, as shown in FIG. 2 by the AND gate block designated AG0 for the line gate matrix PPG/TH0 and by the AND gate block, designated AG9 for the line gate matrix PPG/TH9. Each AND gate block also has a priming input which is connected to a respective one of the thousands outputs from the pulse counter early. Thus, in the example quoted above, if the drive pulse applied from the drive pulse highway R00 had been in respect of the first 1000 line group, then a priming pulse will be present on the thousands output ETH0 from the counter early, causing the gates in the group AG0 to be primed to pass the metering output signals derived from the line gates 0000 – 0009 in the line gate matrix PPG/THO the corresponding output signals from the line gate matrices PPG/TH1 – PPG/TH4 being without effect since the AND gate groups associated with these matrices are not primed at this time.

With regard to the half matrix PPG/UN, as shown in FIG. 2, these gates have their pulse drive inputs connected to the fifty pulse drive highways Q00 – Q49 from the pulse matrix PCM2, while the 10 outputs from this half matrix are connected to the inputs to the AND gate group AG0 in parallel with the ten outputs from the line gate matrix PPG/THO. By arranging for the gating signal $\overline{ETTA}$ applied to the gating matrix PCM2 to persist beyond the counter early position 9999 to the counting position 10,499, and for the thousands marking ETH0 to commence immediately upon the termination of the thousands marking signal ETH9 then the line gates forming the half matrix PPG/UN will be interrogated, in the manner described above while the counter early is counting over positions 10,000 – 10,499 and since the line gates PPG/THO are not being driven at this time, the AND gates AG0 can serve to pass the PPG/UN output signals, without ambiguity.

Each group of AND gates AG0 – AG9 provides ten output highways, as indicated at A00 – A09 for the group AG0 and at A90 – A99 for the group AG9. Corresponding highways from each AND gate group are OR gated, in the OR gate group indicated by the block BA on to respective ones of a single set of 10 output highways, designated B00 to B09, which are connected in parallel to respective inputs to two, 10 bit, buffer stores designated ESM and OSM, respectively. These stores are arranged to operate sequentially, so that during each count of 10 by the counter early, one store records, in parallel form and at time EU2, the metering signal information in respect of the 10 line addresses then being counted, while the other store is reading out serially the metering signal information appertaining to the previous count of 10. To this end, for the recording of information from the highways B00 – B09, the store ESM is primed from the output from a priming gate ESG which operates in response to the even tens marking signal $\overline{ETA}$ and the counter early Units output EU2, while the store OSM is primed from the output from priming gate OSG, which operates in response to the odd tens marking signal ETA and the units output EU2. For the read-out of information from the stores each store presents 10 output highways which are respectively connected to one input to each of a group of 10 AND gates of which only the gates ERG0 and ERG9 for the store ESM, and ORG0 and ORG9 for the store OSM, are shown. Each of these gates has two further inputs of which one is constituted by the respective unit marking output EU0 – EU9 from the pulse counter early, while the remaining (third) input is provided, in respect of the gates ERG0 – ERG9, by the odd decade marking signal ETA, and in respect of the gates ORG0 - ORG9, by the even decade marking signal $\overline{ETA}$. Thus, again referring to the example described above, the metering signals derived from the line gates 0000 – 0009 are applied via the AND gate group AG0 and the OR gate group BA to respective inputs to the buffer stores ESM and OSM. During this decade count, the even tens marking signal $\overline{ETA}$ from the counter early will be present and at units time EU2, the store ESM is primed to accept the metering signal information into respective ones of its storage positions 0 – 9. At the commencement of the next, odd, decade count by the counter early the even marking signal $\overline{ETA}$ is replaced by the odd marking signal ETA, so that during this odd. decade count the store OSM will be primed from the output of gate OSG to accept the metering information derived from the interrogation of the line gates 0010 – 0019, as previously described, while the information in the store ESM will be read-out sequentially under control of the AND gates ERG0 – ERG9. The metering signal outputs from the gates ERG0 – ERG9 and from ORG0 – ORG9, are applied to a single meter pulse highway LFL, via "OR" gates OPE, OPO and OPG. Due to the sequential action of the buffer stores ESM and OSM as described above, each metering signal which appears on the highway LFL is delayed, relative to its disc store address, by ten time slot periods. Thus, in the example quoted above, the metering signals resulting from the interrogation of line gates 0000 – 0009 would appear on the meter pulse highway LFL in respective ones of the metering time slots 0010 – 0019, while the metering signals resulting from the interrogation of line gates 0010 – 0019 would appear on the output highway LFL in respective ones of the metering time slots 0020 – 0029, and so on. To indicate this time shift the designation LFL is given the suffix (−10).

Turning now to FIGS. 3 – 6 and FIG. 13 of the attached drawings, these illustrate, schematically, the logic arrangements associated with the temporary part of the disc store for the verification and temporary storage of the meter pulse signals derived from the line gate (metering signal lead) interrogation described above with reference to FIG. 2.

Figure 3:
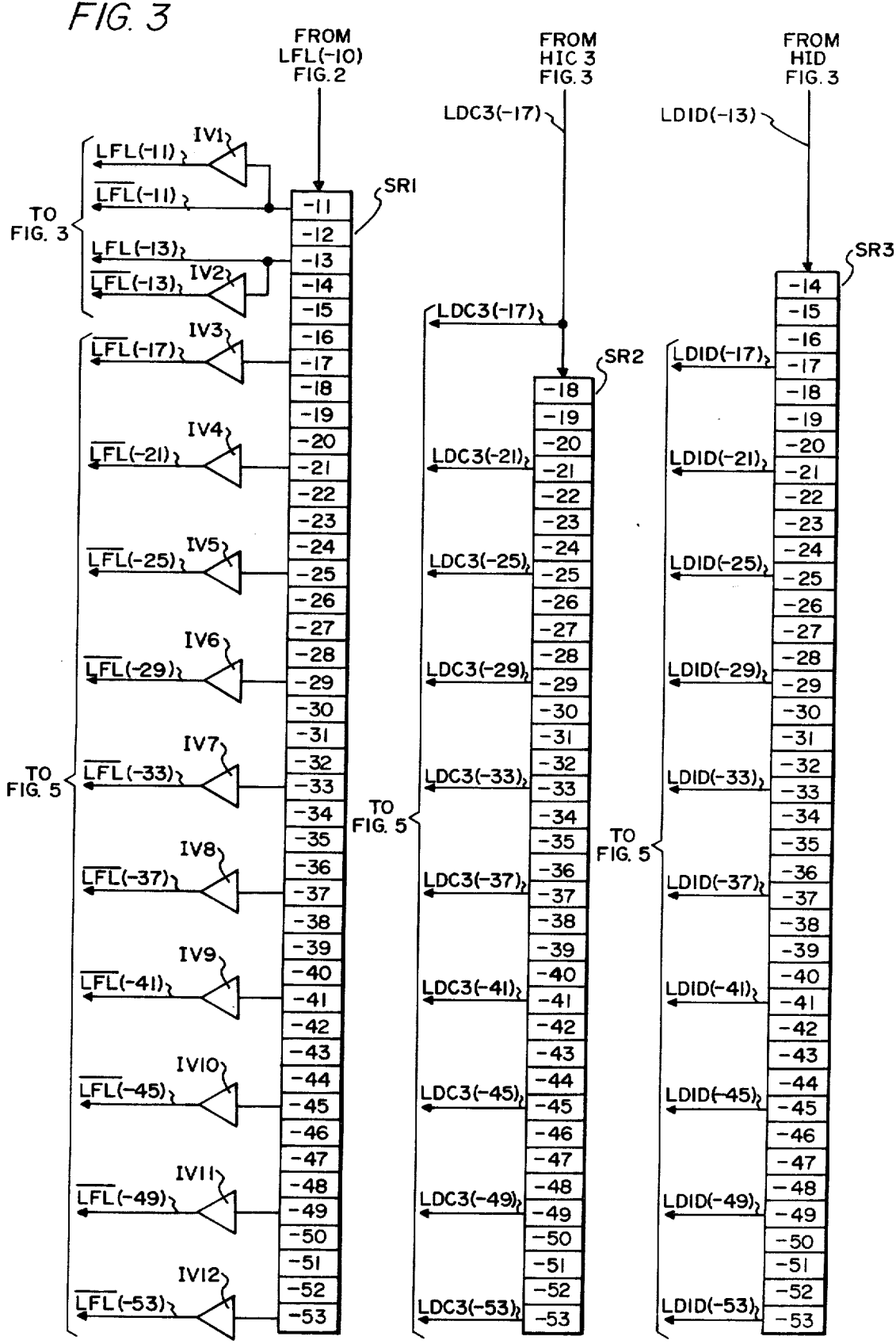
FIGS. 3 and 4 are schematic diagrams illustrating the delay timing and logic switching arrangements associated with the meter pulse verification tracks of the dynamic store.
Figure 4:
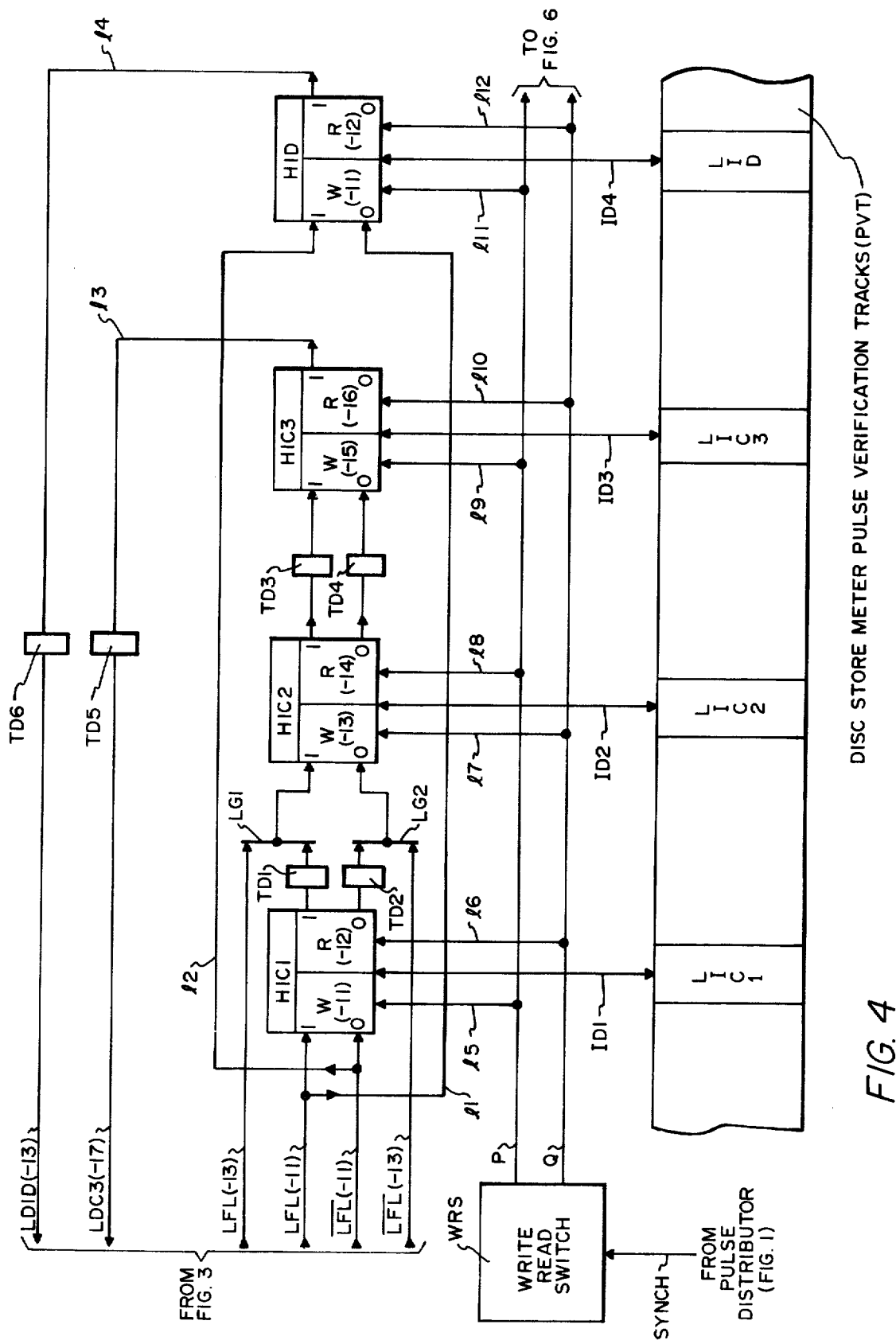
Figure 5:
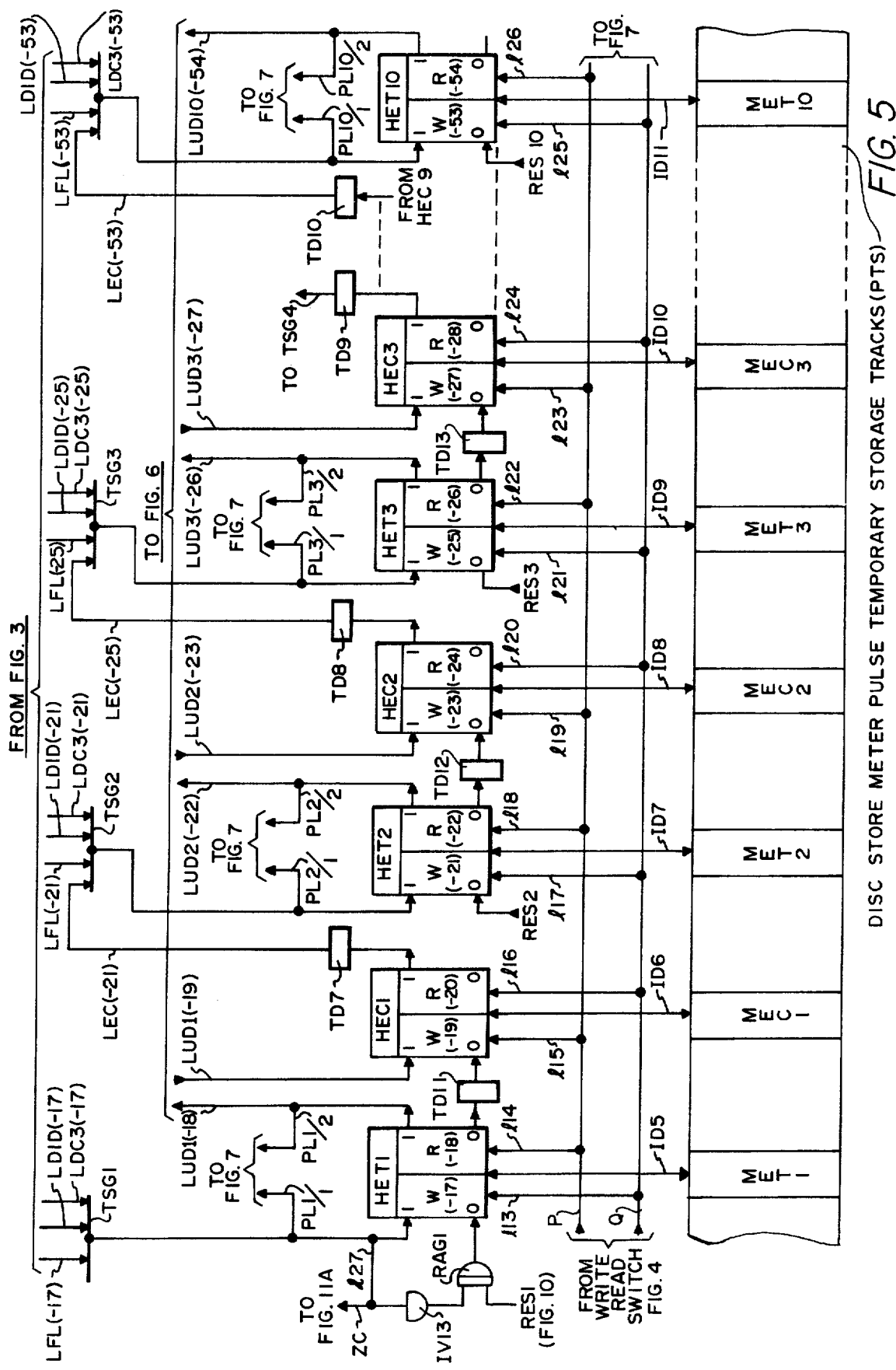
FIGS. 5 and 6 are schematic diagrams illustrating the delay timing and logic switching associated with the verified meter pulse temporary storage tracks.

FIGS. 4 and 5 of the drawings show, respectively, logic arrangements associated with the disc store meter pulse verification tracks PVT (FIG. 4) and with the verified meter pulse temporary storage tracks PTS (FIG. 5). FIG. 3 shows a first group of signal delaying shift registers which operate in conjunction with the logic shown in FIG. 4, while FIG. 6 shows a second group of signal delaying shift-registers which operate in conjunction with the logic shown in FIG. 5.

Referring generally to FIGS. 4 and 5, FIG. 4 shows, schematically, at PVT a section of the disc store containing the meter pulse verification tracks LIC1, LIC2, LIC3 and LID, while FIG. 5 shows similarly a section of the disc store containing the meter pulse temporary storage tracks MET1 – MET10, of which only the tracks MET1, MET2, MET3 and MET10 are shown, and intervening buffer tracks MEC1 – MEC9, of which only the tracks MEC1, MEC2 and MEC3 are shown. Associated with each storage track there is shown a read/write apparatus block, those in FIG. 4 being designated HIC1, HIC2, HIC3 and HID, while those in FIG. 5 are designated HET1, HET2, HET3 and HET10, HEC1, HEC2 and HEC3. Each of these apparatus blocks is to be regarded as including the read/write heads belonging to the associated disc store track, the interface amplifiers and the read/write switching logic appertaining to the read/write head. The read/write apparatus blocks are arranged to operate in their "read" and "write" modes alternately, during alternate disc revolutions under control of a read/write switch WRS (FIG. 4) which provides two output signal highways P and Q. The read/write switch WRS operates to a synchronising pulse from the pulse distributor (FIG. 1) to switch its output signal from one to the other of the P and Q highways at the start of each disc revolution. Connections are made from the P and Q highways to prime respective "read" and "write" elements of the read/write apparatus blocks, the arrangement being such that parallel read and write operations are effected in respect of different read/write apparatus blocks. Thus, the signal on highway P during one disc revolution is applied over leads l5, l9 and l11, (FIG. 4) to prime the write elements of the read/write apparatus blocks HIC1, HIC3 and HID and over lead 18 to prime the "read" element of the read/write block HIC2. Similarly, in FIG. 5, the signal on the P highway is applied over leads l15, l19 and l23 to prime the "write" elements of the HEC apparatus blocks and over leads l14, l18, l22 and l26 to prime the "read" elements of the MET apparatus blocks. When the signal on highway P is replaced by a signal on highway Q at the start of the next disc revolution, the read/write apparatus blocks are caused to change their mode of operation by the priming signals applied over the respective connecting leads from the Q signal highway. The lines indicated at ID1 – ID11, FIGS. 4 and 5, are intended to indicate the inductive coupling between the storage tracks and their respective read/write heads.

Figure 6:
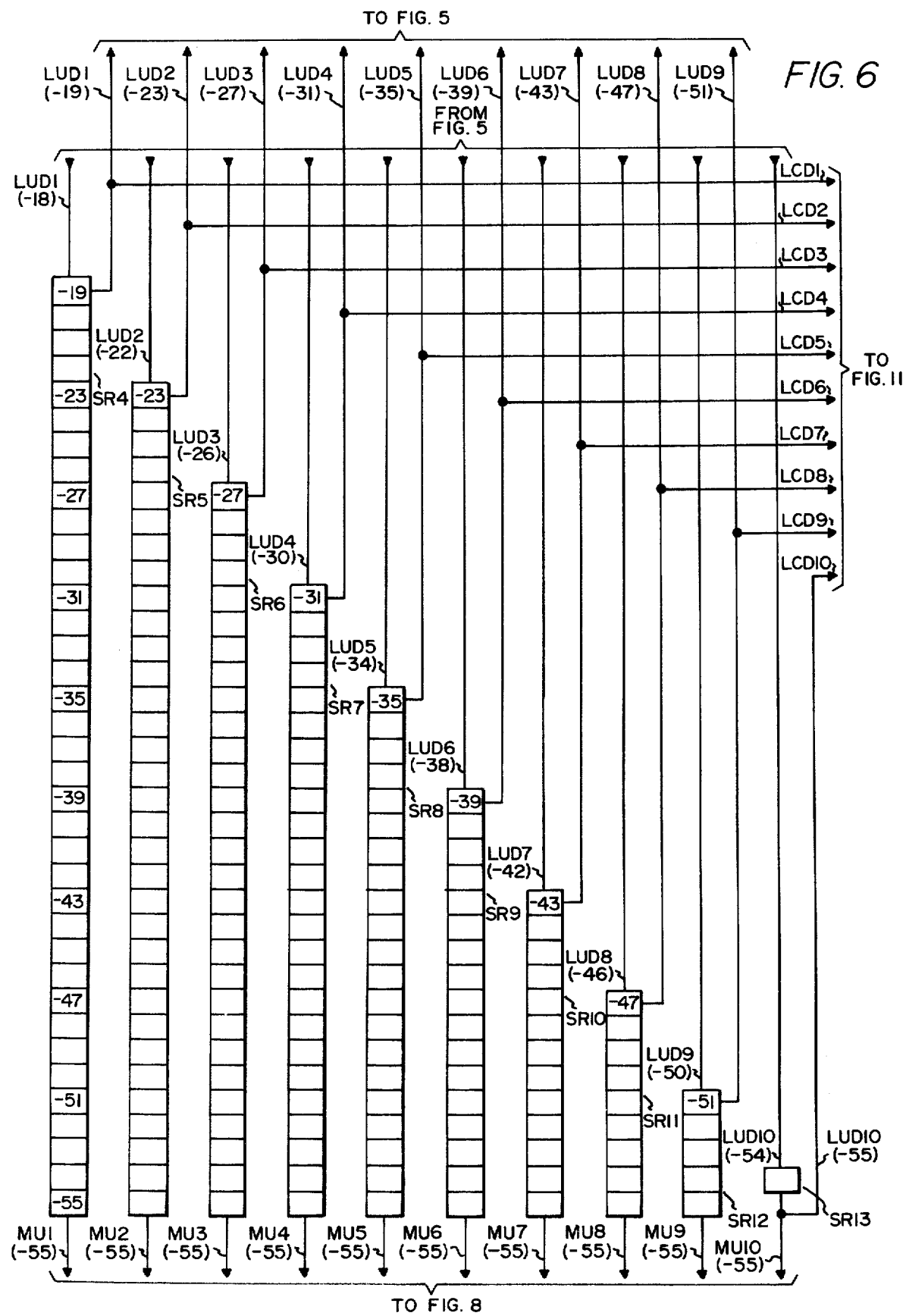
Figure 13:
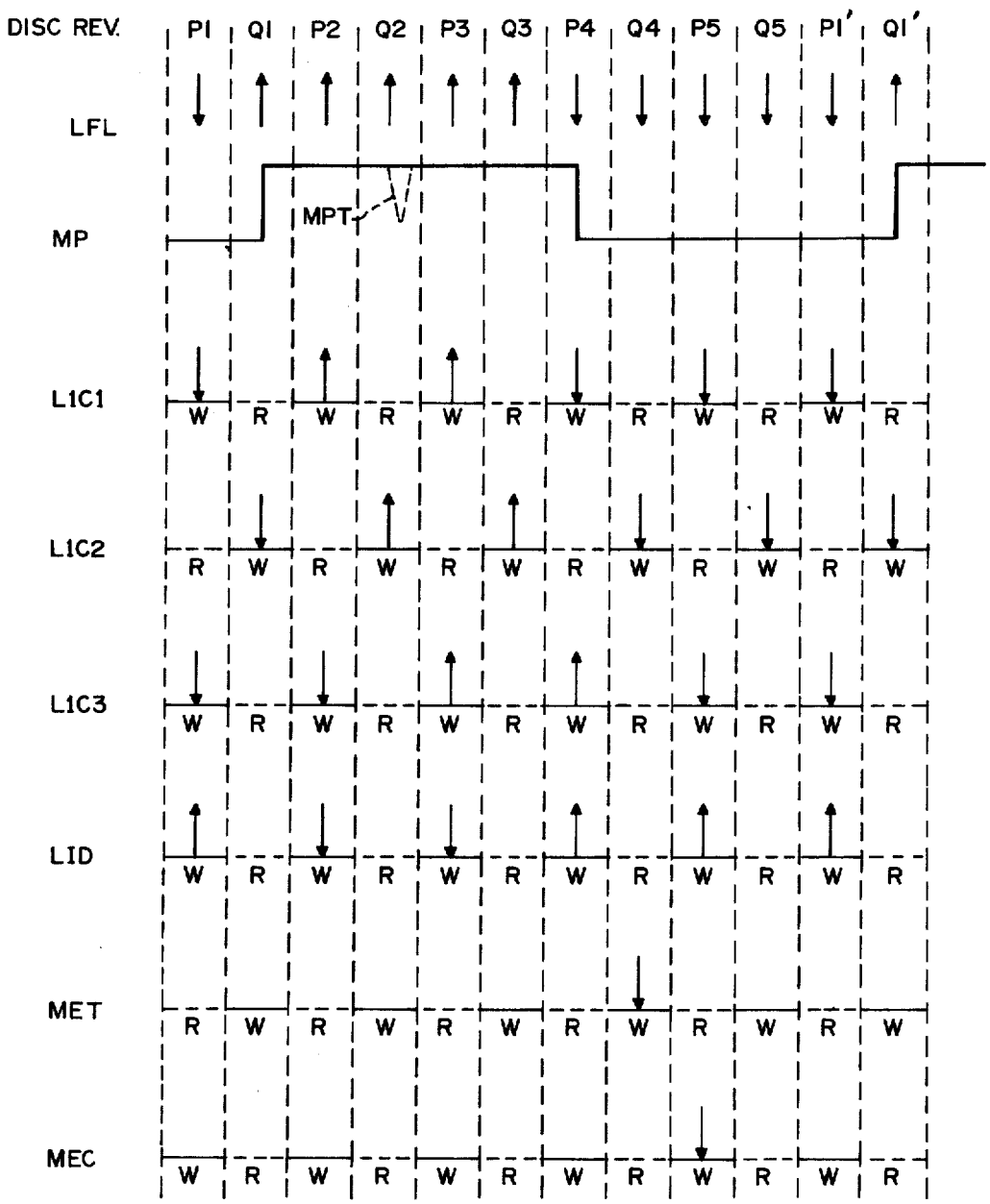
FIG. 13 is an explanatory diagram for use in assisting an understanding of the delay timing and logic switching arrangements of FIGS. 5, 6, 7 and 8.

Referring generally to FIGS. 3, 6 and 13 of the drawings, the shift registers, designated SR1, SR2, SR3, shown in FIG. 3, function in conjunction with FIG. 4 for the verification of meter pulse signals which are applied from the meter pulse highway LFL (−10) FIG. 2, to the input of shift register SR1, FIG. 3. The same shift registers also serve to effect a scanning action in respect of the temporary meter pulse storage tracks, FIG. 5 to cause a verified meter signal to be recorded in the respective storage cell of the first storage track, MET(x) which is not already storing a meter pulse in respect of the particular metering signal lead address concerned. Each shift register position is designated with a number (−11), (−12) and so on. These numbers refer to time slot periods, hereinafter termed relative time slot (R.T.S.) periods by which is meant the time slot displacement of a signal in that shift register position, or output signal lead relative to the counter early address of the exchange metering signal lead to which the signal pertains. Output tappings are provided from particular shift register positions, so that as applied input signals progress through the shift registers, output signals are applied to these output tappings, successively, in specified R.T.S. periods. FIG. 6 shows a further group of ten shift registers, designated SR4 – SR13 inclusive. These shift registers function similarly to those of FIG. 3 but are associated with the temporary meter pulse storage circuit of FIG. 5. The shift registers SR4 – SR13 are of progressively shorter length so that each provides an overall R.T.S. displacement which complements that of the meter pulse signals applied to the respective shift register inputs, to a total of 55 time slot periods. It will be noted that the shift register SR13 is a single step shift register and may take the form of a single time slot delay element. The shift registers provide a first group of output leads (LUD1 – 10) from their first step positions and a second group of output leads (MU1 – MU10) from their last step outputs. The former provide for checking and control functions, described later below, while the latter serve to pass the requests for updating to the apparatus associated with the semi-permanent part of the disc store, as outlined earlier above with reference to FIG. 1. Although not shown, it is to be understood that the shift registers in FIGS. 3 and 6 are arranged to be stepped in synchronism with clock pulses derived from the disc store clock pulse tracks. FIG. 13 is an explanatory diagram which shows at MP the envelope wave form of a meter pulse signal which may be applied to an exchange metering signal lead in respect of a telephone call established by the subscriber to whom the particular metering signal lead pertains. The vertical dotted lines indicate the starting points of successive disc revolutions, the latter being designated P1, Q1 ....... P5, Q5, to indicate the signal highway P or Q over which the read/write switch WRS (FIG. 4) is applying the read/write output signal during the respective disc revolutions. For the sake of example the meter pulse MP has been shown as commencing approximately mid-way through the Q1 disc revolution, but it will be appreciated that a meter pulse may occur at any point in the P, Q sequence of disc operations. The arrow heads, designated LFL indicate an assumed point in each disc revolution at which the particular metering signal lead is interrogated, a downwardly pointing arrowhead indicating that the interrogation has resulted in a binary 0 signal being applied to the highway LFL(−10), FIGS. 2 and 3, and an upwardly pointing arrowhead indicating that a binary 1 signal has been applied to the highway LFL(−10). The lines which extend horizontally beneath the meter pulse indicated at MP in alternate disc revolutions indicate the "write" mode, while the intervening dotted lines indicate the "read" mode of the read/write apparatus group associated with the respective pulse verification tracks LIC1, LIC2, LIC3, and LID, and with a temporary meter pulse storage track MET. As before, a downwardly pointing arrowhead indicates the writing, or continued storage, of a binary 0 signal while an upwardly pointing arrowhead similarly refers to a binary 1 signal.

Referring again to FIG. 4, the logic of the meter pulse verification sequence may be expressed, generally, as follows:

During a "first look" revolution of the disc store, that is while the disc is executing a P revolution, the meter pulse signals MPS are written into the track LIC1 in logic terms.

Write 1 in LIC1 when MPS is 1.
Write 0 in LIC1 when MPS is 0.

Thus track LIC1 is updated every other disc revolution to record the current state of the meter pulse signals derived from highway LFL(−10).

During the next Q disc revolution that is, approximately 17.5 milli-seconds later, the information stored on LIC1 is readout and AND gated with the current, corresponding meter pulse signals, the AND gate output signals being written into track LIC2, in logic terms.

Write 1 on LIC2 if LIC1 is 1 and MPS is 1.
Write 0 on LIC2 if LIC1 is 0 and MPS is 0.

The binary 1 recording on track LIC2 constitute "second look" recordings and indicate that the respective meter pulse signals have been verified. If in this Q disc revolution a meter pulse signal, which had been binary 1 in the previous P revolution, now appears as binary 0, then no recording is made on track LIC2 in respect of this meter pulse.

Track LIC3 is a buffer track to which the information recorded in track LIC2 is transferred during the next P revolution of the disc. Thus, Write 1 on LIC3 if LIC2 is 1.
Write 0 on LIC3 if LIC2 is 0.

The final line condition track LID records the opposite information to track LIC1. Thus, Write 1 in LID if MPS is 0.

Write 0 in LID if MPS is 1.

Thus, if in respect of a particular meter pulse we have a 1 recorded in track LIC3 to indicate that the pulse has been accepted and a 1 is recorded in track LID, then that meter pulse has once been detected to have ended.

If, on the following Q revolution, MPS is still 0 then the pulse termination is verified and the meter pulse signal may be recorded in the first temporary storage track MET (FIG. 5). Thus, Write 1 in MET1, if LIC3 is 1 and LID is 1 and MPS is 0.

The above operations will now be described in more detail with reference to FIGS. 3, 4 and 13. During disc revolution P1 (FIG. 13), when the particular metering signal lead to which the pulse MP is applied, is interrogated, a binary 0 meter pulse signal will appear at the input to shift register SR1 (FIG. 3) over highway LFL(−10). This signal traverses the shift register to provide successive output signals, but of these only the output from the first position (−11) is effective, the binary 0 output signal, inverted to binary 1 by the inverter IV1, being applied at R.T.S.(−11) over lead LFL(−11) to the 0 input to the write element of HIC1 (FIG. 4) and over leads LFL(−11) and l2 to the 1 input to the write element HID. These write elements are both primed during this revolution by the signal from the P highway applied over lead l5 and l11, respectively. The HIC1 write element responds by writing a binary 0 condition onto the respective storage cell of track LIC1, thus ensuring that this storage cell is in a "re-set" condition, if it is not already in this condition. The HID write element responds by writing binary 1 condition into the respective storage cell of track LID, thus ensuring that this storage cell is in a "set" condition if it is not already in this condition.

It may be noted here, that due to the dynamic nature of the disc store, the storage cell into which an item of information is recorded is delayed by approximately half a time slot period with respect to the R.T.S. period of the applied signal, while a further half time slot delay occurs when the signal is read-out from the storage cell. Thus in the circuit action described above, the signals are applied in R.T.S.(−11) and the respective storage cells extend over R.T.S. period −11.5 to −12.5, so that when these storage cells are subsequently read-out, by their respective "Read" elements, the output signals occur in R.T.S. (−12). In the following description, for simplicity, we will refer to a storage cell by the R.T.S. reference of the applied input signal and it will be understood that the output signal from this storage cell will be one time slot later.

During the next, Q1, revolution of the disc, the meter pulse signal resulting from the interrogation of the particular exchange metering signal lead is a binary 1 signal, but this signal is without effect since the read/write apparatus groups HIC1 and HID are in their read modes at this time due to the presence of the read/write switch output signal on highway Q, which is applied to the "Read" elements HIC1 and HID over connecting leads l6 and l12 respectively. The respective binary 0 and binary 1 signals read-out from these read elements are also without effect.

For the sake of this explanation, we will assume that during the next, P2, disc revolution, the respective meter pulse signal is, again, a binary 1 signal, as indicated in FIG. 13. As before, this signal is applied to the input to the shift register SR1 over highways LFL(−10) but in this case, the binary 1 signal is applied from the first shift register position, over lead LFL(−11) to the 1 input to write element HIC1 (FIG. 4), causing the storage cell (−11) of track LIC1 to be set to record a binary 1 condition. The signal over lead LFL(−11) is also applied over lead l1 to the 0 input to the write element HID to cause the storage cell (−11) of this track to be re-set to record a binary 0 condition. These recordings indicate the initial detection of a meter pulse signal and constitute "first look" recordings.

During the next Q2 disc revolution, it is again assumed that the respective meter pulse signal is binary 1, and as before this is applied to the input of shift register from highway LFL(−10). At R.T.S. (−12) storage cell (−11) of track LIC1 (FIG. 4) is read-out from the read element HIC1 from whose 1 output a signal is applied, over a one time slot delay element TD1, to one input to a coincidence gate LG1, the signal arriving in R.T.S. (−13). Meanwhile the meter pulse signal applied over lead LFL(−10), FIG. 3, has been stepped along the shift register SR1 and has reached position (−13) from which position a binary 1 signal is applied over lead LFL(−13) to the other input to gate LG1. The gate LG1 operates to the time coincidence of the signals on its inputs and applies an output signal in R.T.S. (−13) to the 1 input to the write element HIC2, which in the Q mode is primed from the Q signal highway, over lead l7. The write element HIC2 responds by causing a 1 metering condition to be recorded in the LIC2 storage cell (−13). This recording constitutes a "second look" recording and indicates that the meter pulse concerned has been accepted as a verified meter pulse.

The pulse verification circuits, FIGS. 3 and 4, now await detection of the termination of the exchange meter pulse signal however long this may persist. Thus, the binary 1 meter pulse signals, derived from the respective exchange metering signal lead, during the subsequent disc revolutions P3 and Q3 (FIG. 13) are without effect. However, during the P3 revolution, the read element HIC2 and the write element of HIC3 are both primed over leads l8 and l9, respectively. Thus, when the LIC2 storage cell (−13) is passing beneath its read/write head a binary 1 signal is passed from the 1 output of read element HIC2 in R.T.S. (−14) over the one time slot delay element TD3, to the 1 input to the write element HIC3, the signal arriving in R.T.S. (−15) causing a binary 1 condition to be recorded in cell (−15) of track LIC3. It will be noted from FIG. 4, that the 0 output signals from the read element HIC2 are similarly applied to the 0 input to the write element HIC3. The track LIC3 thus records the same information as track LIC2 but its read/write modes are opposite to those of track LIC2. Thus, during each subsequent Q revolution, until it is re-set from HIC2, a binary 1 output signal will be read-out from the read element HIC3 in R.T.S.(−16) and is applied over lead l3 and the one time slot delay element TD5 and lead LDC3 (−17) to the input to shift register SR2 (FIG. 3). However, these signals are ineffective until the termination of the exchange meter pulse signal (FIG. 13) has been verified, as explained below.

In the example shown in FIG. 13, the exchange meter pulse terminates approximately mid-way through the P4 disc revolution, so that a binary 0 meter pulse signal results from the T4 interrogation of the particular metering signal lead concerned, which is assumed to occur at a later point in the disc revolution. Thus, during the P4 disc revolution, the binary 0 meter pulse signal which is applied to the input to shift register SR1 over highway $\overline{LFL}$(−10) passes, in the manner previously described over lead $\overline{LFL}$(−11) FIG. 3 to re-set the cell (−11) of track LIC1, FIG. 4, and over leads $\overline{LFL}$(−11) and /2 to set the storage cell (−11) of track LID to record a binary 1 condition. This represents a first look at the exchange meter pulse ended condition.

During the next Q4 disc revolution the binary 0 meter pulse signal derived from the particular metering signal lead is applied, as before, to the input to the shift register SR1, along which it is stepped. The SR1 shift register output over $\overline{LFL}$(−11) is without effect since HIC1 is in its read mode and cell (−11) of track LIC1 is already re-set. The output over $\overline{LFL}$ (−13) coincides with the 0 output (−12) from the read element HIC1, which is applied via the one time slot delay element TD2, at R.T.S.(−13). These signals are applied to the inputs to gate LG2, which operates to apply a re-setting signal to the 0 input to write element HIC2, thereby re-setting the storage cell (−13) of track LIC2 to the binary 0 condition. During R.T.S.(−13) a binary 1 signal also appears over lead LDID(−13), FIG. 4, and is applied to the input to shift register SR3, this signal resulting from the read-out of the previously set storage cell (−11) of track LID, from the 1 output of read element HID, the signal passing over lead 14 and the one time slot delay element TD6. The binary 0 meter pulse signal is shift register SR1 and the signal in shift register SR3 now step in synchronism with one another, so that at any time during their progress along their respective shift registers, the positions they occupy have corresponding R.T.S. displacements. As previously described at R.T.S. (−16) a signal appears from the 1 output from read element HIC3 and is applied, over lead /3, the one time slot delay element TD5 and lead LDC3 (−17) to the input to shift register SR2, FIG. 3, and also, in time coincidence with the signals on lead LDID (−17) and $\overline{LFL}$ (−17) to the three input AND gate TSG1 (FIG. 5). The signal $\overline{LFL}$ (−17) represents the "second look" at the meter pulse ended condition. The gate TSG1 operates in R.T.S. (−17) to apply a binary 1 signal to the 1 input to the write element HET1 and also to the leads designated PLI/1 and /27, the latter being for a purpose to be described later below. The write element HET1 is primed from the read/write switch highway Q over lead /13 and assuming cell (−17) of track MET1 is not already recording a binary 1 condition in respect of a previously verified meter pulse from the particular metering signal lead concerned, the write element HET1 will now respond by causing a binary 1 condition to be recorded in this storage cell. This recording represents a fully verified meter pulse which is retained in the temporary storage track MET1 until the updating apparatus, later described, is available to carry out an updating operation in respect of this particular exchange metering signal lead address.

The binary 0 meter pulse signals derived from the particular exchange metering signal lead during the disc revolutions P5 and Q5 (FIG. 13) are without effect. However, during the P5 disc revolution, the previously re-set cell (−13) of track LIC2 is read-out from the 0 output of read element HIC2 over the one time slot delay element TD4, to the 0 input to write element HIC3, to cause cell (−15) of track LIC3 to be re-set to its 0 condition. Thus the storage cells of the pulse verification tracks appertaining to the particular exchange metering signal lead address are now at normal awaiting the onset of the next meter pulse signal over the particular exchange metering signal lead. The further actions which occur in regard to the temporary storage of verified meter pulse signals in the temporary storage tracks MET1 − 10 and MEC1 − 9, are described in detail below with reference to FIGS. 3, 5 and 6 of the attached drawings.

However, digressing for the moment, it will be noted that the explanatory diagram of FIG. 13 depicts an exchange meter pulse signal which extends over five revolutions of the disc store, that is, the meter pulse shown is assumed to have ON/OFF durations of approximately 87 milli-seconds each. It may be verified from a study of FIG. 13, however, that the verification arrangements above described are capable of functioning with exchange meter pulse signals which extend over only three disc revolutions, that is, whose ON/-OFF periods are approximately 57.5 milli-seconds each. Again, with the pulse verification arrangements described, it will be appreciated that a genuine meter pulse signal, if severely mutilated by the occurrence of transient signals on the exchange meter pulse signal lead, may be rejected by the pulse verification arrangements or that a heavy transient signal may be accepted as a genuine meter pulse signal. However, it is anticipated that such occurrences will be relatively few and will tend to cancel each other out in the overall operation of the system. Where the meter pulse signal is of the order of 87 milli-seconds as shown in FIG. 13, then a degree of meter pulse correction is provided in that if, for example in the disc revolution Q2, the LFL signal appeared as a binary 0 signal due to the occurrence of a transient which caused a break in the exchange meter pulse signal, as indicated at MPT, FIG. 13, then this binary 0 signal would be ineffective since neither of the gates LG1 nor LG2 (FIG. 4) could operate to the resulting $\overline{LFL}$(−13) signal, consequently no information would be recorded in storage cell (−13) of track LIC2. However, assuming the exchange meter pulse signal is restored prior to the P3 interrogation, then the binary 1 recorded in track LIC1 will be unaffected and during the next Q3 disc revolution, the binary 1 LFL signal would then cause a binary 1 condition to be recorded in cell (−13) of track LIC2. Thus, the effect of this transient mutilation of the meter pulse signal has been to delay the recording of the pulse verified condition in track LIC2 by two disc revolutions, and since these are accommodated within the meter pulse period, the overall functioning of the pulse verification arrangements is unaffected. A similar pulse correcting action would occur if the LFL signal occurring during the Q4 disc revolution appeared as a binary 1 signal instead of the binary 0 signal shown in FIG. 13. In this case the verification of the meter signal pulse ended condition and the recording of the verified meter pulse signal in cell (−17) of track MET1 (FIG. 5) would likewise be delayed by two disc revolutions until the occurrence of the LFL signal during the Q5 disc revolution.

For the temporary storage of verified meter pulses, reference will now be made to FIGS. 3, 5, 6 and 13. As previously described, the disc store provides 10 meter pulse temporary storage tracks, of which only the four, designated MET1, MET2, MET3 and MET10, are shown, FIG. 5. In addition, there are nine buffer tracks, one of which is interleaved between each pair of MET tracks and of which only three, designated MEC1, MEC2 and MEC3 are shown. Each track has an associated read/write apparatus group, designated HET1, HEC1, HET2, HEC2 and so on, to HET10. The read and write operations of the respective read/write apparatus groups occur in time slots which are displaced from one another by one time slot. Thus a write operation by write element HET1 occurs, as previously described in R.T.S.(−17). The read-out from HET1 occurs one time slot later, in R.T.S.(−18). The write operation by write element HET2 occurs in R.T.S.(−19), the read-out from HEC1 occurs in R.T.S.(−20), and so on. Corresponding storage cells in adjacent ones of the temporary storage tracks are thus displaced from one another by 2 R.T.S. periods, the storage cell (−17) in MET1 corresponding to the storage cell (−19) in MEC1 and so on to the storage cell (−53) in MET10. The HET apparatus groups are primed from the read/write switch (FIG. 4) output highways P and Q, to "write" during the Q disc revolutions and to "read" during the P disc revolutions, while the HEC apparatus groups are primed to "write" during the P disc revolutions and to "read" during the Q disc revolutions. Each "read" element HET1 - HET10 has its 1 output connected to a respective one of ten output leads designated respectively LUD1(−18), LUD2(−22), LUD3(−26) and so on to LUD10(−54), each LUD lead carrying signals whose R.T.S. displacement is four time slots greater than the preceding LUD lead. These LUD leads are respectively connected to the input to an associated one of a group of shift registers, designated SR4 − SR13, FIG. 6. Each of these shift registers has a number of shift positions which complements the R.T.S. displacement of the signals on its input to a total of 55 time slot periods. Thus, the lead LUD(−18) is connected to the input to the shift register SR4, which has 37 shift positions (37 + 18) = 55. The lead LUD2(−22) is connected to shift register SR5, which has 33 shift positions (33 + 22) = 55, and so on, the lead LUD10(−54) being connected to shift register SR13, which has only one shift position.

Output leads LUD1(−19), LUD2(−23), LUD3(−27) and so on to LUD9(−51) are connected from the first shift position outputs of shift registers SR4 − SR12, to respective ones of the "write" elements HEC1 − HEC9, as indicated in FIG. 5 for the "write" elements HEC1 − HEC3 there shown. These first shift register positions, together with an output from shift register SR13 are also connected to a second set of output leads designated LCD1 − LCD10 respectively, while a third set of output leads, designated MU1(−55) − MU10(−55) are extended from the last shift positions from the shift registers. These output leads are connected to elements of updating apparatus associated with the semi-permanent part of the store, described later below.

Referring again to FIG. 5, the 1 input to each of the "write" elements HET1 − HET10 is connected to the output from an associated AND gate, as indicated by the gates TSG1, TSG2, TSG3 and TSG10, while the "read" elements HEC1 − HEC9 have their 1 outputs connected, in chain formation, over a one time slot delay element to one input to the TSG AND gate associated with the succeeding "write" element HET. Thus, the 1 output from the "read" element HEC1(−20) is connected over the one time slot delay element TD7 and lead LEC(−21) to one input to the four input AND gate TSG2, the other three inputs to which are connected to the outputs $\overline{LFL}$(−21), LD1D(−21) and LDC3(−21) from the shift registers SR1, SR2, SR3 (FIG. 3). Similarly the 1 output from the "read" element HEC2(−24) is connected over the one time slot delay element TD8 and lead LEC(−25) to one input to the four input AND gate TSG3, whose other three inputs are connected to the FIG. 3 outputs $\overline{LFL}$(−25), LD1D(−25) and LDC3(−25), and so on, the 1 output from the "read" element HEC9(−52), not shown, being connected over the one time slot delay element TD10 and lead LEC(−53) to one input to the four input AND gate TSG10, whose other three inputs are connected to the FIG. 3 shift register outputs $\overline{LFL}$(−53), LD1D(−53) and LDC3(−53).

The 0 inputs to the "write" elements HET1 − HET10 are connected to respective re-setting leads RES1 − RES10, the lead RES1 being connected over an AND gate RAG1. These re-setting leads are extended from the updating apparatus associated with the semi-permanent part of the disc store and, together with the functioning of gate RAG1, will be described later below. The 0 outputs from the "read" elements HET1 − HET9 are connected over a one time slot delay element, such as TD11, TD12, TD13 and so on to the 0 inputs to the associated "write" elements HEC1 − HEC9, as indicated in FIG. 5 for the respective "read" and "write" elements HET1, HEC1, HET2, HEC2, and so on, so that a re-setting signal applied to the 0 input to a "write" element HET, during a Q revolution of the disc causes the respective storage cell of the associated MET track to be re-set to the binary 0 condition and so that during the next P disc revolution a signal will be read-out from the 0 output from the HET "read" element to the 0 input to the associated HEC "write" element to cause the re-setting of the respective MEC storage cell.

The HET read/write apparatus groups also have their inputs and outputs connected over leads, respectively designated PL1/1, PL1/2; PL2/1, PL2/2; PL3/1, PL3/2; and so on to Pl10/1, PL10/2. These are connected to respective inputs to the priority register element of the updating apparatus and will also be described later below.

In operation of the temporary storage arrangements, as previously described, the verification of the meter pulse signal, indicated in FIG. 13 and resulting from successive interrogations of a particular exchange metering signal lead was assumed to have culminated, during disc revolution Q4 (FIG. 13) in the recording of a binary 1 condition in cell (−17) of the temporary storage track MET1. During the next, P5, disc revolution, the "read" element HET1 and the "write" element HEC1 are both primed from the read/write switch P highway over leads /14 and /15, respectively. Thus, while cell (−17) of track MET1 is passing beneath its read/write head, a binary 1 signal is read-out, in R.T.S.(−18) from the read element HET1 and is applied over lead LUD(−18) to the input to the shift register SR4, FIG. 6 along which it progresses in synchronism with the clock pulses (not shown) from the disc clock pulse tracks. Upon stepping to the first shift position (−19) an output signal is applied over lead LUD(−19) to the 1 input to "write" element HEC1, causing a binary 1 condition to be recorded in cell (−19) of track MEC1. Upon stepping to the last shift position (−55) a signal is passed over lead MU(−55) to indicate to the updating apparatus that a single meter fee unit has been temporarily stored in respect of the particular metering signal lead and is available for updating. During the next, Q5, revolution of the disc store, the "read" element HEC1 is primed from the read/write switch Q highway over lead /16 and while the respective cell (−19) of track MEC1 is passing beneath its respective read/write head, a binary 1 signal is applied from the 1 output of "read" element HEC1 over the one time slot delay element TD7 and lead LEC(−21) to one input to gate TSG2. The signal applied to the input to shift register SR4 over lead LUD(−18) and the signal applied to the input to gate TSG2 over lead LEC(−21) are now reiterated during each subsequent Q revolution of the disc, as the binary 1 condition of the storage cells, (−17) of track MET1 and (−19) of track MEC1 are read-out until these storage cells are reset, as described above, from the updating apparatus.

As previously described, one or more further metering pulses may occur on the particular exchange metering signal lead before the updating apparatus can attend to the request for updating in respect of the single meter fee unit already stored in respect of the particular metering signal lead, and the system being described provides for the temporary storage of up to ten meter pulse signals, this being sufficient to cater for the most exceptionally high levels of exchange traffic. Of course, where such exceptionally high levels of exchange traffic are unlikely to occur the amount of temporary storage apparatus may be reduced by limiting this to provide for the temporary storage of, for example, three, or seven, meter pulse signals.

Assuming now that a further, second, meter pulse signal occurs on the particular metering signal lead concerned, before updating has occurred in respect of the first meter pulse signal already stored in track MET1. This second meter pulse will be verified in the manner described above for the first meter pulse signal and in the Q4 disc revolution for this second meter pulse, signals $\overline{LFL}$(−17), LD1D(−17) and LDC3(−17) will be applied from the outputs of shift registers SR1, SR2 and SR3 (FIG. 3) to operate gate TSG1, but the output signal from this gate will not affect the storage cell (−17) of tracks MET1 and MEC1, since these tracks are already recording a binary 1 condition. However, when the respective signals in shift registers SR1, SR2 and SR3 are stepped to their respective shift positions (−21), output signals are then applied over leads $\overline{LFL}$(−21), LD1D(−21) and LDC3(−21) to respective ones of three of the inputs to gate TSG2 (FIG. 5) and will coincide in time with the signal from "read" element HEC1, which, as previously described, is applied to the fourth input to gate TSG2 over lead LEC(−21). Gate TSG2 consequently operates to apply a signal to the 1 input to "write" element HET2(−21) which is primed from the read/write switch highway Q over lead /17, to cause a binary 1 condition to be recorded in cell (−21) of the temporary storage track MET2. During the next P5 disc revolution for this meter pulse signal, the storage cell (−21) will be read-out from the 1 output of read element HET2(−22) and applied over lead LUD2(−22) to the input to shift register SR5, FIG. 6, along which it will be stepped to appear over lead MU2(−55) to indicate to the updating apparatus that there are now two meter pulse signals recorded in the temporary part of the store in respect of the particular metering signal lead being considered. Also, when the shift register SR5 is stepped to its first shift position (−23), a signal is applied over lead LUD2(−23) to the 1 input to "write" element HEC2, to cause a binary 1 condition to be recorded in cell (−23) of track MEC2, so that during the next and subsequent Q disc revolutions signals will be applied from the 1 output of read element HEC2 and the one time slot delay element TD8 over lead LEC(−25) to the fourth input to gate TSG3. Should a further, third, meter pulse signal occur on the particular metering signal lead then the operations described above will be repeated, but in this case the operation of gates TSG1 and TSG2, during the respective Q4 disc revolution in response to the output signals from the shift positions (−17) and (−21) of shift registers SR1 – SR3 will have no effect on the recordings already made in tracks MET1 and MET2, but gate TSG3 will be operated from the signals applied from the shift position (−25) of these shift registers, thereby causing a binary 1 condition to be recorded in cell (−25) of the temporary storage track MET3, and, in the manner previously described, during the next P disc revolution this results in the application of a signal over lead LUD3(−26) to the input to shift register SR6, FIG. 6, which provides an output signal over lead MU3(−55) to indicate that three meter pulse signals are awaiting updating, and an output signal over lead LUD3(−27) to cause a binary 1 condition to be recorded in cell (−27) of track MEC3. Thus, during the next and subsequent Q disc revolutions, the gate TSG4, not shown, will be prepared in R.T.S.(−29) by a signal applied from the "read" element HEC3 via the one time slot delay element TD9. In a similar manner the occurrence of further meter pulse signals on the particular metering signal lead results in the recording of a binary 1 condition in cell (−29) of track MET4, and in cell (−31) of track MEC4, for a fourth meter pulse signal, in cell (−33) of track MET5 and in cell (−37) of track MEC5 for a fifth meter pulse signal, and so on to cell (−53) of track MET10, for a tenth meter pulse signal. Also, as each successive meter pulse is recorded in the respective MET track a signal will be read-out from the associated "read" element HET and will be applied over the respective output lead LUD to the input of the respective shift register SR7 – SR13 (FIG. 6) to indicate over its output lead (MU4 – MU10) the number of meter pulse signals which have been recorded in the temporary storage tracks and in respect of which updating is required. Also, as each "write" signal is applied to a write element HET($x$) from the output from a TSG($x$) gate, during the Q disc revolutions and as each MET($x$) cell is read-out from the read element HET($x$), corresponding priority signals are applied to the priority register, described below over the respective priority leads PL1/1, PL1/2; PL2/1, PL2/2; and so on to PL10/1, PL10/2.

Figure 7:
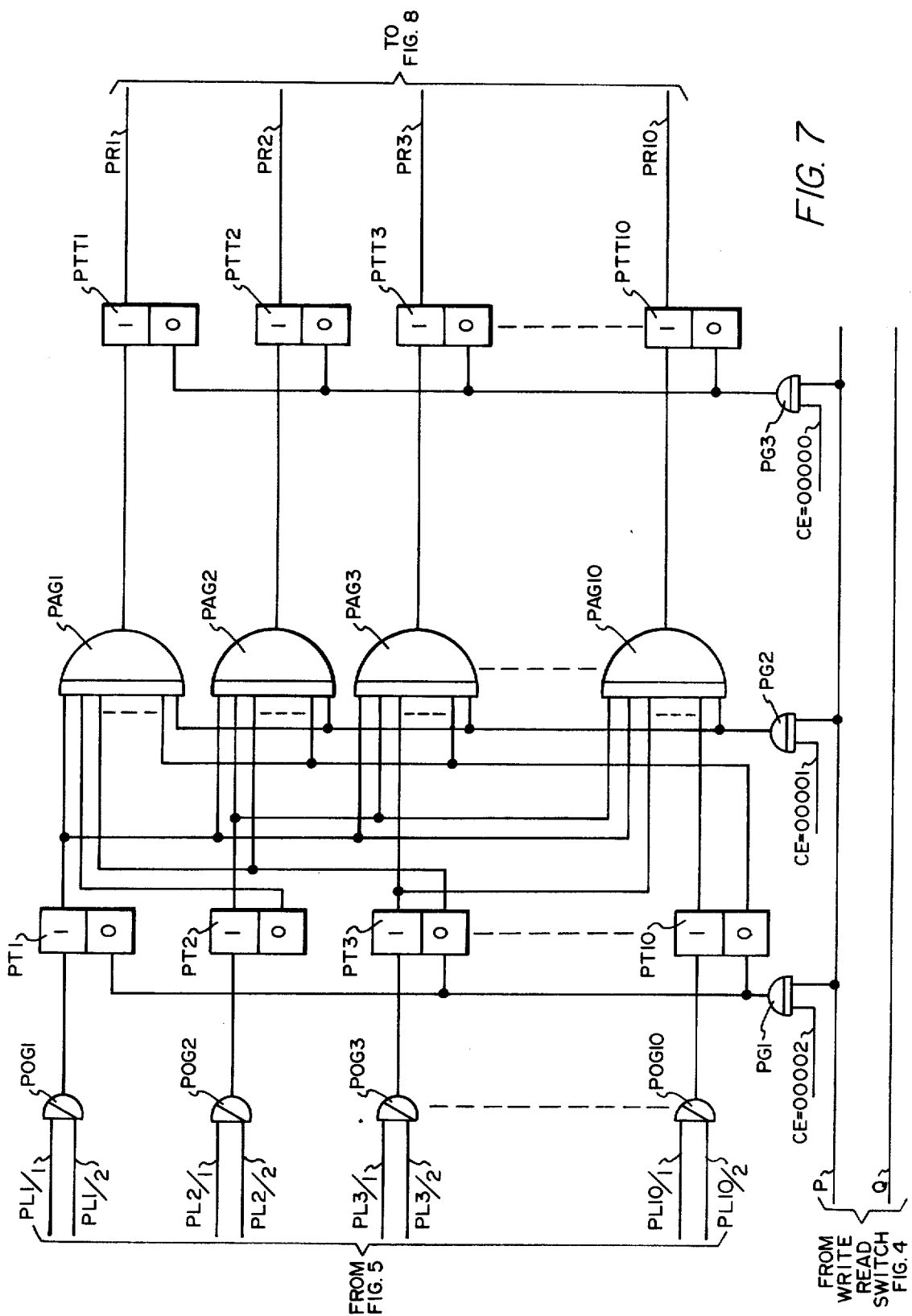
FIGS. 7 and 8 illustrate the priority control arrangements for initiating updating commands to the updating apparatus associated with the semi-permanent part of the store.
Figure 8:
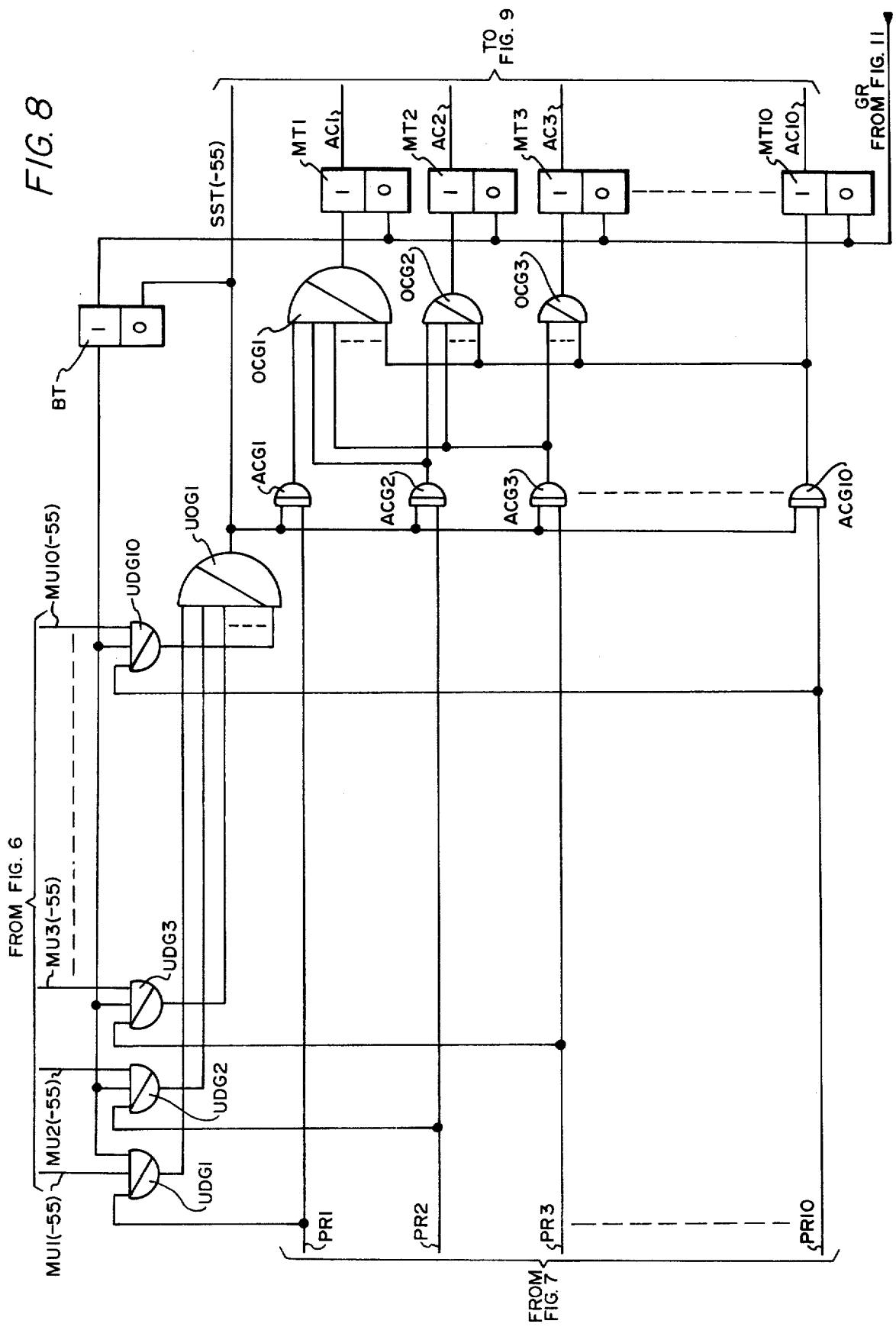

Referring now to FIGS. 7 and 8, these show, respectively, the priority register and priority control equipment, which forms part of the updating apparatus, outlined above with reference to FIG. 1, group C of the attached drawing. The priority register and control units function, in conjunction with the updating apparatus so that when the latter is available to attend to a request for updating of a meter fee record, it will search for and attend to the request which is made in respect of the highest number of temporarily stored meter pulse signals. In this way the possibility of the meter pulse signals, applied from a particular metering signal lead, overflowing the temporary storage capacity provided, before the updating apparatus attends to its request for updating, is reduced.

The priority register of FIG. 7 comprises first and second groups of bi-stable elements, there being ten bi-stable elements in each group, of which only the first, second, third and tenth, are shown. The first group, designated PT1 – PT10 have their 1 inputs connected to the outputs from a group of 10 OR gates, designated POG1 – POG10, of which only the OR gates POG1, POG2, POG3 and POG10 are shown. Each of these OR gates has two inputs, designated PL1/1, PL1/2; PL2/1, PL2/2, PL3/1, PL3/2; and so on to PL10/1, PL10/2. These input leads are extended from the respective read/write apparatus groups, described above with reference to FIG. 5, the priority leads PL1/1, PL1/2 extended from the read/write apparatus group HET1, FIG. 5, being connected respectively to the inputs to OR gate POG1, and the input pairs PL2/1, PL2/2; to PL10/1; PL10/2, extended from respective ones of the subsequent read/write apparatus groups HET2 to HET10, being similarly connected to respective ones of the OR gates POG2 – POG10, FIG. 7. The second group of bistable elements, designated PTT1 – PTT10 have their 1 inputs connected to the outputs from respective ones of a group of ten AND gates, designated PAG1 – PAG10, of which only the AND gates PAG1, PAG2, PAG3 and PAG10 are shown, and have their 1 outputs connected to respective ones of a group of 10 output leads, designated PR1 – PR10, of which only the output leads PR1, PR2, PR3 and PR10 are shown. Each of the AND gates PAG1 – PAG10 has 11 inputs, of which, only five are shown in FIG. 7. One input to each AND gate is connected, in common, to the output from a strobing gate PG2, described below. The remaining ten inputs to each AND gate are connected to respective ones of the 1 and 0 outputs from the bistables PT1 – PT10, in such a way that an AND gate, PAG($x$) will operate in response to the strobing pulse from gate PG2, only if each of the bistables PT1 – PT$x$ is set to its 1 condition, and each of the bistable PT($x$ + 1) – PT10 is in its re-set, 0 condition. Thus, AND gate PAG1, will operate only when bistable PT1 is set to its 1 condition and each of the bistables PT2 – PT10 is in its re-set 0 condition. Similarly AND gate PAG2 will operate only when each of the bistables PT1 and PT2 is set to its 1 condition and each of the bistables PT3 – PT10 is in its re-set 0 condition and so on, the AND gate PAG10 operating only when each of the bistables PT1 – PT10 is set to its 1 condition. This arrangement prevents an updating operation being effected in respect of a meter pulse signal which is recorded in a storage cell of a later priority MET, temporary storage track, without there being at least one meter pulse signal recorded in each of the earlier priority MET tracks. Such an improper recording might occur for example due to a fault in the scanning action effected by the shift registers SR1 – SR3 (FIG. 3) and the gates TSG1 – TSG10 (FIG. 5) and although not shown in FIG. 7, it will be appreciated by those skilled in the art, that further logic may readily be associated with the AND gates PAG1 – PAG10 whereby upon the occurrence of an improper recording as described above, a fault signal and corrective fault routine are automatically initiated. The bistables PT1 – PT10 and the bistables PTT1 – PTT10 are arranged to be re-set, at the start of each P disc revolution, by the output from the respective re-setting AND gates PAG1 and PAG3 while the AND gates PAG1 – PAG10 are strobed to operate from the output from the strobing gate PG2 as previously mentioned, each of these AND gates has one input connected to the P highway from the read/write switch (FIG. 4). Gate PG1 has its second input connected to a clock pulse output from the pulse distributor, which occurs at clock pulse early time 00002, while gates PG2 and PG3 are respectively connected to clock pulse outputs which occur at counter early times 00001 and 00000.

In operation of the priority register of FIG. 7, during successive disc revolutions, the meter pulse signals being written into, or read-out from respective ones of the temporary storage tracks MET1 – MET10 are applied successively and in order to one or other of the leads of each pair of priority leads PL1/1, PL1/2; PL2/1, PL2/2, and so on up to the lead pair of highest priority encountered during a disc revolution. Thus, during a P disc revolution, if a metering pulse signal is recorded in each of one or more of the storage cells of temporary storage track MET1, (FIG. 5), then when the first of these is read-out from the associated read element HET1, a signal will appear over priority lead PL1/2 and will be applied via OR gate POG1 (FIG. 7) to set bistable PT1, thereby indicating that track MET1 is recording at least one priority 1, meter pulse. Further priority 1 signals applied to lead PL1/2 during this P disc revolution are without effect. Similarly, if one or more storage cells of track MET2 have a meter pulse recorded therein, then at a point in the disc revolution subsequent to the occurrence of the first priority 1 signal from track MET1, a signal will be read-out from the first of the set storage cells of track MET2, and will be applied via OR gate POG2, to set the bistable PT2, FIG. 7, to indicate that track MET2 is recording at least one priority 2 meter pulse and so on, until at the end of this P disc revolution, a number of bistable elements PT1 – PT$x$ will have been set to their 1 conditions. The set condition of PT($x$) indicating the highest priority temporary storage track MET($x$) from which a meter pulse signal was read-out over priority lead PL$x$/2 during this revolution. During the next Q disc revolutin, when "write 1" command signals may be applied to the read/write apparatus groups HET (FIG. 5), if a write 1 command is applied to a write element HET from its associated TSG gate, which is of next higher priority, i.e. HET($x$ + 1) then the priority signal applied over lead PL($x$ + 1)/1 will be effective and will pass via OR gate POG($x$ + 1) to set the bistable PT($x$ + 1) FIG. 7.

At the start of the next P disc revolution, at counter early time 00000, the bistable elements PTT1 – PTT10 are re-set from the output from gate PG3, and at counter early time 00001, the AND gates PAG1 – PAG10 are strobed, and, in consequence of the interconnection between the outputs from the bistables PT1 – PT10, and the inputs to the gates PAG1 – PAG10, previously described. The gate PAG($x$ + 1) alone will operate to pass an output signal to set the bistable PTT($x$ + 1) to its 1 condition, causing the latter to apply a signal to mark the output priority lead PR($x$ + 1). At counter early time 00002, the bistables PT1 – PT10 are re-set so that the examination of the temporary storage tracks for the highest priority track containing a meter pulse signal or signals, during the ensuing P and Q disc revolutions may proceed. Thus at the start of each P disc revolution, one priority output lead PR($x$) or PR($x$ + 1) will be marked to indicate the highest priority temporary metering track which contains a meter pulse signal, encountered during the examination carried out during the previous P disc revolution and the intervening Q disc revolution. It may be noted here that since no metering pulse signals can be present in any of the storage cells 0 – 16 of the temporary storage tracks, the re-setting and strobing actions described above do not interfere in any way with the priority lead examination described above.

The priority control apparatus of FIG. 8 serves to effect the search function whereby the updating apparatus, described later below is caused to attend to the updating request of highest priority, as indicated from the priority register, FIG. 7. The circuit of FIG. 8 comprises a first group of input leads PR1 - PR10 which extend from the priority register, FIG. 7. A second group of input leads MU1(−55) - MU10(−55) which extend from the shift registers SR4 - SR13, FIG. 6, and a group of output leads of which one, designated SST(−55) is a start signal lead, while the remainder, designated AC1 - AC10 are updating command signal leads, over respective ones of which a marking signal is applied to indicate the first, second, and so on, up to the xth meter pulse signal in respect of which updating is required. The start lead SST(−55) and the updating command signal leads AC1 - AC10 are connected to a sequencer element of the updating apparatus as also described later below. The priority input leads PR1 - PR10 are each connected to one input to respective AND gates in each of two AND gate groups, designated respective UDG1 - UDG10, of which only the gates UDG1, UDG2 and UDG10 are shown and ACG1 - ACG10, of which only the gates ACG1, ACG2, ACG3 and ACG10 are shown. The gates UDG1 - UDG10 each have a second input connected to a respective one of the input leads MU1(−55) - MU10(−55) and a third input which is connected to the 1 output from a busy/-free bistable BT. The outputs from the AND gates UDG1 - UDG10 are connected to respective inputs to a multi-input OR gate UDG1, while the output from the latter gate is connected to the start lead SST(−55) and in common to a second input to each of the AND gates ACG1 - ACG10. The outputs from the AND gates ACG1 - ACG10 are connected in a decreasing progression to the inputs to nine OR gates, of which only three, designated OCG1, OCG2 and OCG3 are shown, the arrangement being such that the occurrence of an output signal from one AND gate ACG(x) causes output signals to appear from each of the OR gates OCG1 - OCG(x). Thus, the OR gate OCG1 has 10 inputs, one from each of the AND gates ACG1 - ACG10, the OR gate OCG2 has nine inputs, one From each of the gates ACG2 - ACG10, the OR gate OCG3 has eight inputs, one from each of the gates ACG3 - ACG10, and so on. The outputs from the OR gates OCG1 - OCG9 and the output from AND gate ACG10 are connected respectively to the 1 inputs to a group of bistables MT1 - MT10, the 1 outputs from which are connected to the respective updating command signal leads AC1 - AC10.

In operation of FIG. 8, as described later below, during a P disc revolution, when the associated updating apparatus has completed an updating operation, a general re-set signal is applied to a lead GR to indicate that the updating apparatus is ready to deal with a further request. The signal on lead GR is applied to re-set the set ones of the bistables MT1 - MT10 and to set the busy/free bistable BT. Bistable BT, setting, applies a priming input to the gates UDG1 - UDG10. At this time one of the priority input leads PR(x), will be marked from FIG. 7, as previously described, providing a first input to the corresponding gate UDG(x), in the AND gate group UDG1 - UDG10 and also providing a first input to the corresponding gate ACG(x) in the AND gate group ACG1 - ACG10. As the disc rotates, successive requests appear from the outputs from the shift registers SR4 - SR13 (FIG. 6), each request indicating by signals on respective ones of the leads MU1 - MU10 the number of meter pulse signals in respect of which the updating is requested. However, so long as the highest number of the MU leads marked is less than MU(x), then these requests are ignored and the examination of the marked MU leads continues until the first request is encountered for which the lead MU(x) is marked and when this occurs, the corresponding gate UDG(x) operates to apply a start pulse signal to the start lead SST(−55), this start signal also being applied as a strobing signal to the second inputs to the AND gates ACG1 - ACG10 and to the 0 input to the bistable BT, which is thereby re-set to remove the priming signal from gates UDG1 - UDG10, which are thus prevented from initiating any further start signals. The AND gate ACG(x), to whose one input the priority signal from lead PR(x) is applied, also operates to pass an output signal via each of the OR gates OCG1 - OCG(x), as above described, to set the corresponding bistables MT1 - MT(x), the setting of these bistables resulting in the application of a marking signal to each of the updating command leads AC1 - AC(x). The start signal on lead SST(−55) thus conveys the address information in respect of which the updating is required, while the marking signals staticised on the updating command leads AC1 - AC(x) indicate the individual meter pulse signals in respect of which the updating is required.

Figure 9:
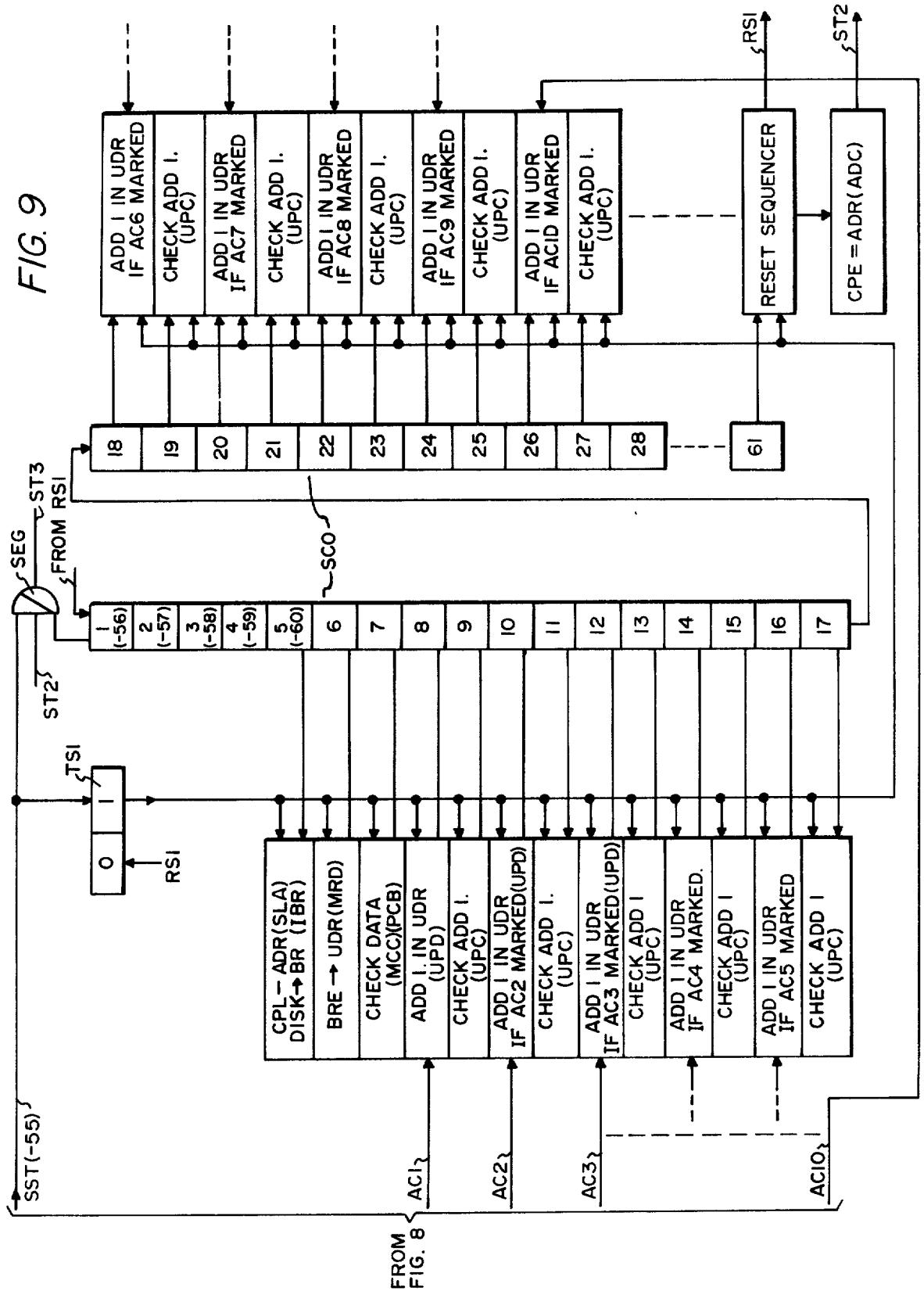
FIGS. 9, 10 and 11 illustrate the sequence control of the updating apparatus.
Figure 10:
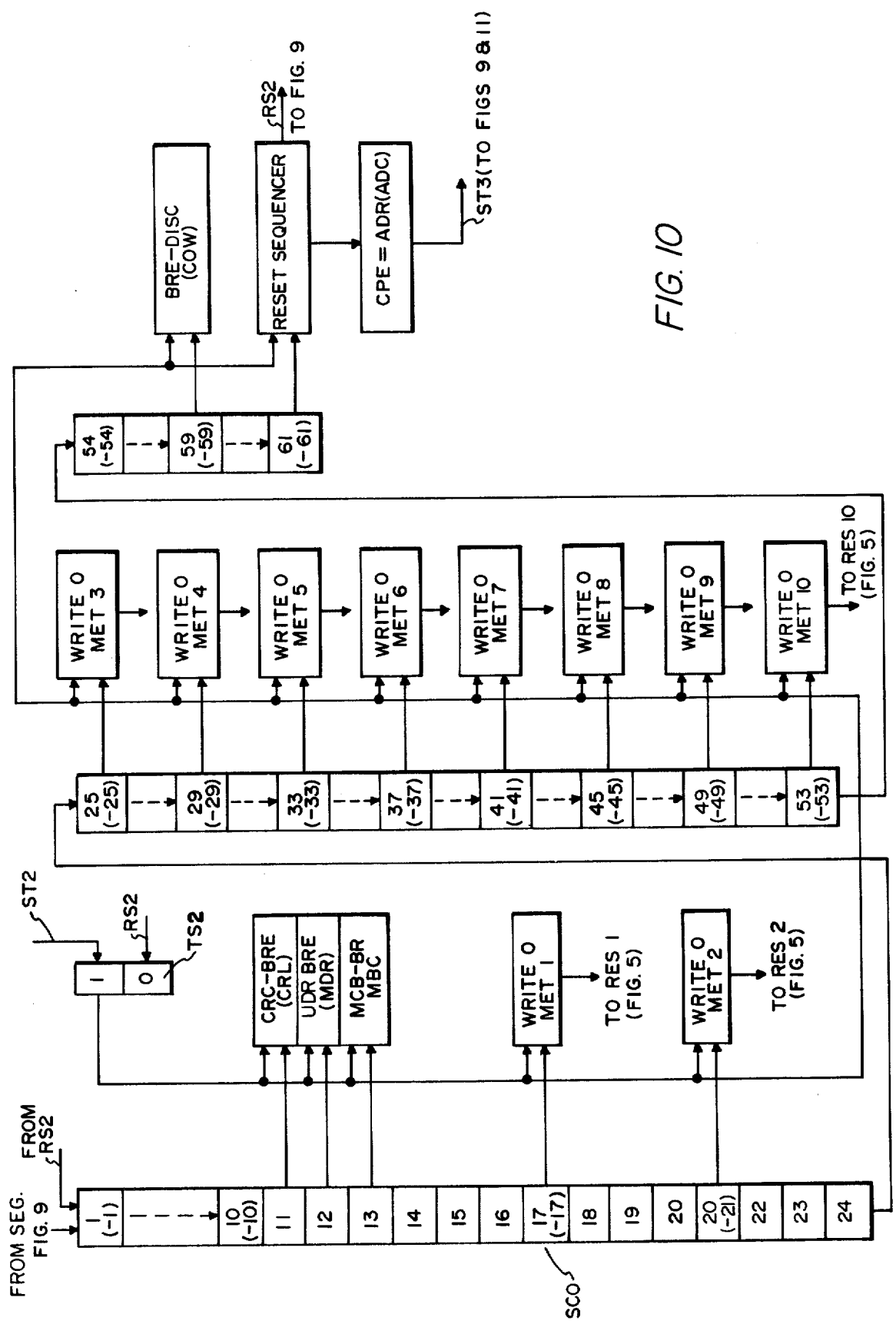
Figure 11:
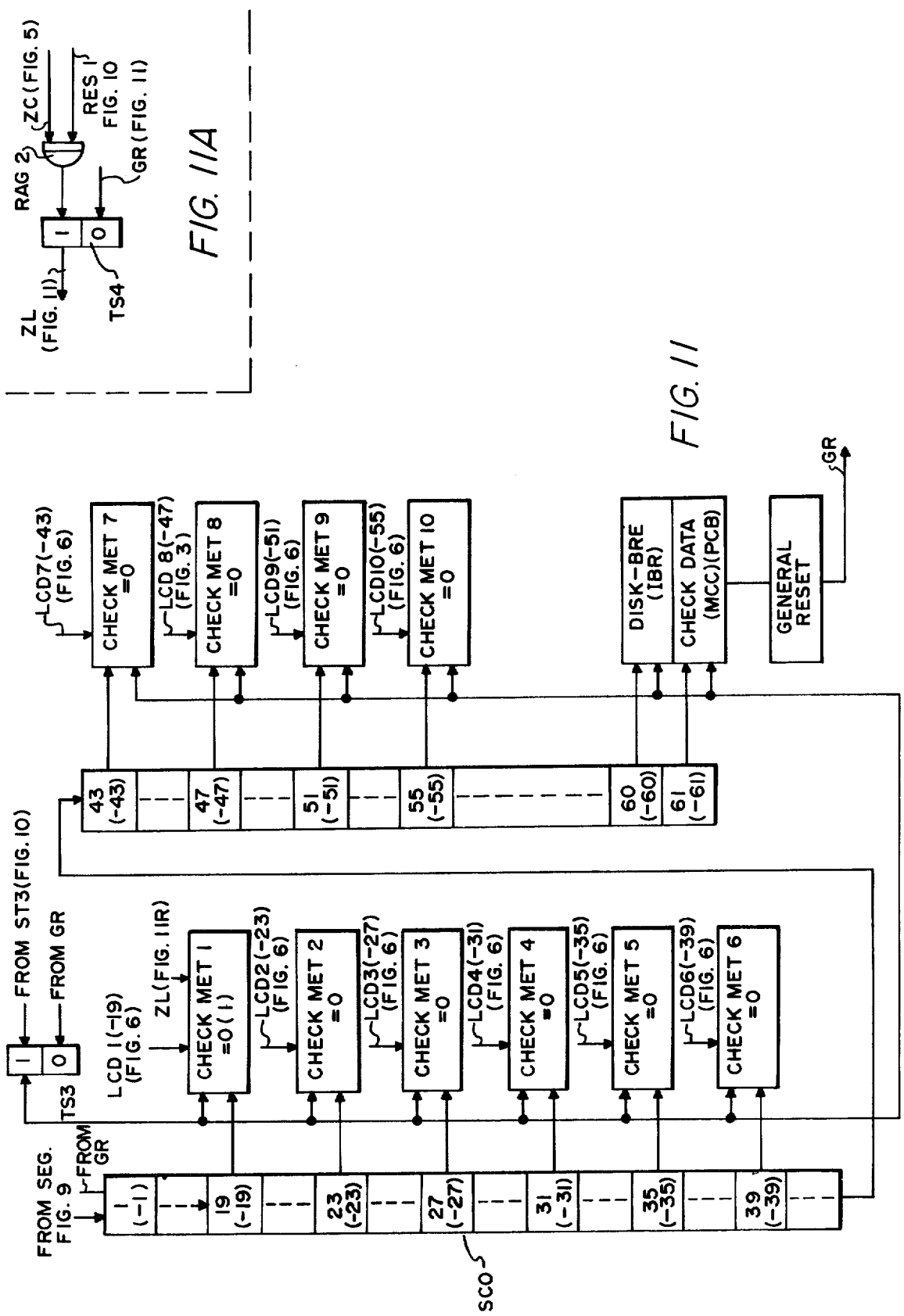

Turning now to FIGS. 9, 10, 11 and 12, FIG. 12 shows in block schematic form, the arrangement of the updating apparatus and the associated semi-permanent storage tracks of the disc store, while FIGS. 9, 10 and 11 illustrate the basic operational programmes carried out by the sequencer element of the updating apparatus.

Figure 12:
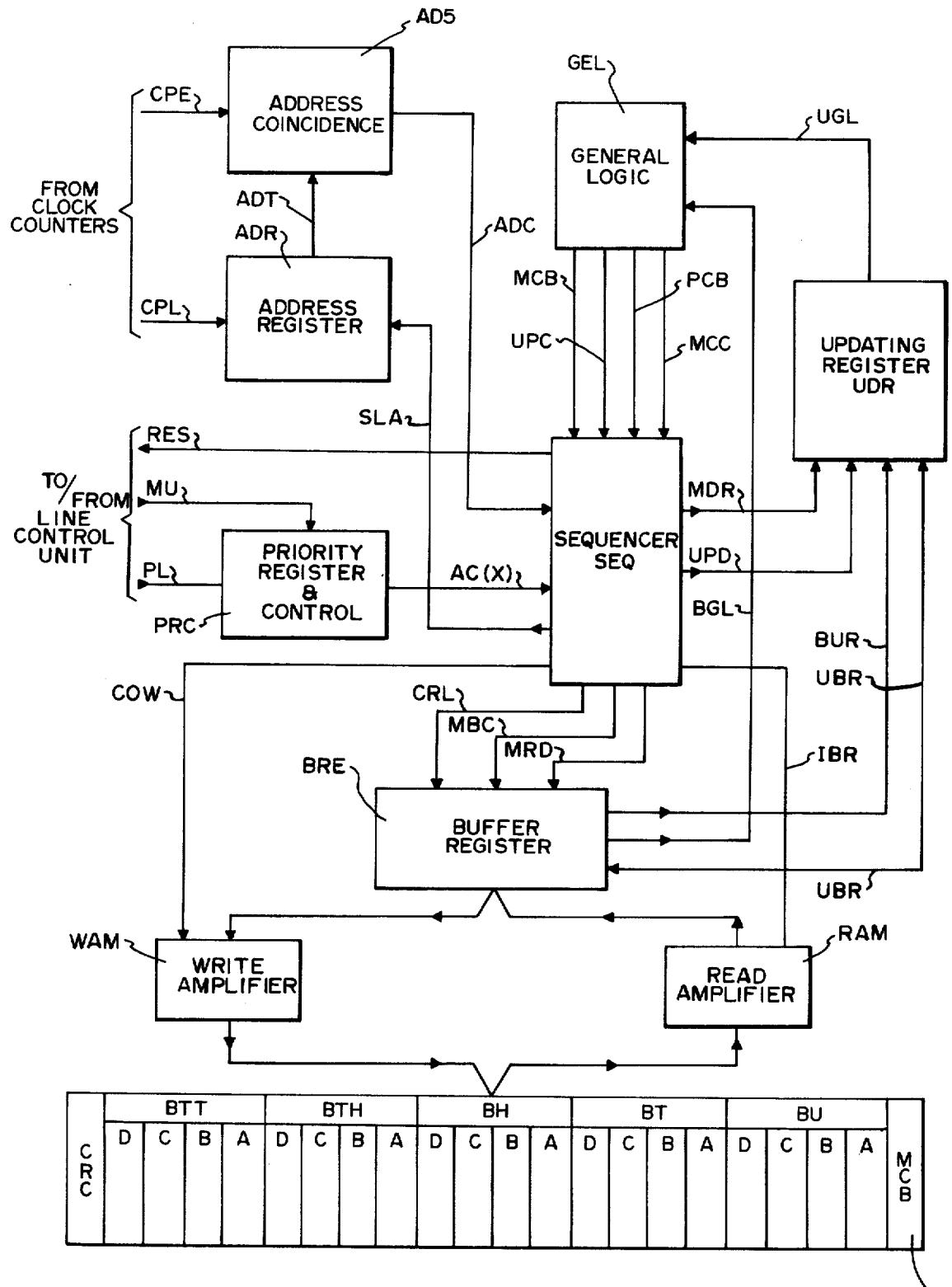
FIG. 12 is a block schematic diagram showing the general arrangement of the updating apparatus.

Considering firstly the general arrangement of the updating apparatus shown in FIG. 12, as previously described, the semi-permanent part of the disc store, indicated at PSS, accommodates 22 storage tracks. These comprise, the meter check bit track MCB, the read-out control track CRC and 20 numerical tracks, which store the accumulated meter fee totals in respect of each metering signal lead served by the metering system being described. The numerical storage tracks form five groups each of four tracks and each group represents a different decimal order, these being a units group BU, a tens group BT, a hundreds group BH, a thousands group BTH and a ten thousands group BTT. The four tracks A, B, C, D, in each group record the respective digital values in binary/decimal code. As also previously described, corresponding storage cells in the semi-permanent part of the store are in line abreast so that the storage cells appertaining to respective metering signal lead addresses appear simultaneously beneath their respective read/write heads, the separate "read" and "write" operations being effected by a parallel mode of operation. Again as previously described, the storage cells of the semipermanent part of the store have a backward displacement of 60 storage cell positions with respect to the reference clock pulse storage cell appertaining to the respective metering signal lead, the metering signal lead address being generated with reference to the time of its interrogation, referred to as relative time slot (R.T.S.) O, by a first counter, termed the "counter early" and also, at the time R.T.S.(−60) when the storage cells appertaining to that metering signal lead appear beneath the read/write heads of the semi-permanent part of the store, by a second counter, termed the "counter late."

In FIG. 12, the read/write heads, together with their associated "write" and "read" buffer amplifiers are indicated, diagramatically, by the blocks designated WAM and RAM, respectively. These are connected to respective inputs to a buffer register BRE, which functions under instruction from the sequencer to staticise the meter fee total together with the MCB and CRC data bits, read-out from the store in respect of a particular metering signal lead address indicated to the sequencer from the priority register and control unit PRC, as described later below. The buffer store is then caused to read this meter fee total to the updating register UDR, which also under instruction from the sequencer, adds to the meter fee total, one or more further units, as instructed. The information staticised in the buffer store, is also passed to a general logic element GEL which performs various checking functions and also determines the new value 1 or 0 of the check bit MCB. The sequencer also marks the read-out control (CRC) data bit, binary 0 if this is not already set to binary 0. As previously explained this CRC bit is used to control read-out from an associated control panel. The updated information is then returned to the buffer store in readiness for its transfer to the respective storage cells of of the semi-permanent part of the store at the moment when these are beneath their respective read/write heads.

To enable the sequencer to determine the correct time slot R.T.S.(−60) for the return of the updated information to the disc store, and also so that it can effect re-setting and checking functions with regard to the respective displaced storage cells in the temporary part of the store, it must be capable of detecting the reference time slot R.T.S.(O) of the metering signal lead in respect of which the updating operation is being effected. To this end, the updating apparatus includes an address register ADR and an address coincidence element ADS. The address register has an input, over lead CPL, from the counter late over which, in successive R.T.S.(−60) time slots, the numerical addresses of the metering signal leads appear, in synchronism with the appearance of their respective storage cells beneath the read/write heads of the semi-permanent part of the store. Similarly, the address coincidence element has an input, over lead CPE, from the counter early, over which, in successive R.T.S.(O) time slots, the numerical addresses of the metering signal leads appear as these are being interrogated. Coincident with the initial read-out of information from the semi-permanent part of the store, the sequencer causes the address of the particular metering signal lead then being generated by the counter late to be staticised in the address register. This staticised address is now compared in the address coincidence circuit with the addresses being presented from the clock pulse early and when the address in treatment is next generated (i.e., approximately one complete disc revolution later) detection of the address coincidence causes a signal in R.T.S.(O) to be applied to the sequencer.

For the performance of its functions the sequencer carries out three program sequences, one in each of three successive revolutions of the disc. The first is a store read-out and updating programme which as mentioned above is effected in response to address information from the priority unit PRC. The second is a re-setting and re-storing programme while the third is a checking programme, the address information for these programmes being obtained from the address coincidence element as above described.

Referring, generally, to FIGS. 9, 10 and 11, the sequencer element comprises a single, 61 position, counting chain, arranged to be stepped, in known manner, by clock pulses, not shown, from the pulse distributor, FIG. 1. The counting chain provides outputs from particular counting positions and these are connected to corresponding logic elements from which appropriately timed programme instruction signals are applied over respective signalling leads, indicated in FIG. 12, to other functional elements of the updating apparatus. FIGS. 9, 10 and 11, show, respectively, the first, second and third programme sequences. For ease of description the 61 position counting chain is repeated in each of these figures, but it will be appreciated that, in fact, only one counting chain is required. The logic elements appertaining to the particular programmes being primed from a respective programme start signal, as described below. The start lead SST(−55) and the updating command leads AC1 - AC10, from the priority control element, FIG. 8, are respectively connected to provide a first programme start signal to the sequence counting chain SCO, FIG. 9, and also to provide updating command signals to respective ones of the logic elements appertaining to the first programme sequence, as also described in more detail below.

The operation of the updating apparatus will now be described in more detail with reference to FIGS. 9, 10, 11 and 12, together. While the disc store is executing a P revolution, and the updating apparatus is at normal, a start signal is applied in R.T.S.(<55) over lead SST(−55), FIG. 9, while staticised signals are applied over each of the updating command leads AC1 - AC($x$), these signals appertaining to the highest priority request for updating, as described above with reference to FIG. 8. The start signal on lead SST(−55) is applied to the 1 input to bistable TS1 from whose 1 output a priming signal is applied to each of the logic elements appertaining to the first programme sequence, as indicated in FIG. 9 and is also applied to an input logic element SEG for the sequence counting chain so that the latter starts its counting action in R.T.S.(−55). In the first programme, no operations occur during the first four counting steps, which serve only to count on from R.T.S.(−55) to R.T.S.(−59). The fifth step occurs in R.T.S.(−60) at which time the information in the storage cells, of the semi-permanent part of the disc store, appertaining to the particular metering signal lead concerned are available for read-out and in this fifth position a signal is applied from the sequence counter to actuate a logic element, designated CPL - ADR, Disk - BRE, which responds by applying a first signal over lead IBR, FIG. 12, to the "read" amplifiers to cause these storage cells to be read-out and the CRC, MCB, and meter fee total data, staticised in the buffer register BRE, and a second signal, over lead SLA, FIG. 12, to cause the metering signal lead address then being presented by the counter late over lead CPL, to be staticised within the address register ADR. At the sixth counter step, the sequence counter applies a signal, via a logic element BRE - UDR, and lead MRD (FIG. 12) to cause the staticised meter fee total to be transferred, over leads BUR from the buffer register to the updating register UDR and over leads BGL to the general logic element GEL to which the updating register also applies the information it has received over leads UGL. The general logic element now compares the data it has received over leads BGL and UGL to verify that this data has been correctly transferred from the buffer register to the updating register, and also checks the received parity bit against the received meter fee total. Upon detecting data coincidence, the general logic applies a transfer check signal over lead MCC, and upon verification of the received meter fee total against the received parity bit, applies a parity check signal over lead PCB to the sequencer. In position 7 of the sequence counter, FIG. 9, receipt of the transfer check signals over leads MCC and PCB is ascertained by interrogation of the "check transfer" logic element. (In the case where the check signals indicate incorrect transfer or incorrect parity, then the sequencer "check data" logic element would be arranged to re-set the updating apparatus by means not shown, so as to allow the updating operation to recommence during the next P disc revolution. This is possible in the first programme sequence, since no information has yet been changed in the disc store. If during the second attempt the fault should recur, then a fault report would be produced by apparatus also not shown, and an alarm signal initiated.).

In position 8 of the sequence counter the logic element "Add 1 in UDR" is interrogated for the presence of an updating command signal on input lead AC1, which, if present, causes a signal to be applied over lead UPD, FIG. 12, to the updating register UDR causing it to add one unit to the meter fee total stored therein. The information presented over lead UGL from the updating register to the general logic is now changed by one unit from that previously indicated and the general logic accepts this as an indication of the correct operation of the updating register, in response to which it applies an "update verified" signal over lead UPC to the sequencer and proceeds to add one unit to its own meter fee total. In position 9 of the sequence counter, the arrival of the "update verified" signal is checked by interrogation of the "check add 1" logic element. (If this signal is not present in counter position 9, then action as described above for the "transfer not verified" condition would occur.). The sequence counter SCO (FIG. 9) continues its counting action, and the operations described above for positions 8 and 9, are repeated for each of the updating command signals being presented over the updating command leads AC2 – AC10. Thus, for example, if the request for updating had been made in respect of three meter signal pulses, then the updating command signal leads AC2 and AC3 would also carry respective updating command signals, so that in position 10 of the sequence counter, interrogation of the respective logic element "Add 1 in UDR" would result in a second signal being applied over lead UPD, FIG. 12, to the updating register UDR to cause it to add a second unit to its recorded meter fee total, and in position 11, the presence of the "update verified" signal would be checked. Similarly in positions 12 and 13 of the sequence counter these actions would be repeated, to cause a third unit to be added to the recorded meter fee total in the updating register UDR. Since in this assumed example no further updating command signals are present on any of the later updating command signal leads, no further updating or checking actions occur during the stepping of the sequence counting chain. When the sequence counter, FIG. 9, reaches its ultimate counting position 61, the "re-set sequencer" logic element is actuated, to apply a re-set signal RS1 to re-set both the sequence counting chain and the bistable TS1. In addition, this logic element primes a further logic element CPE = ADR. The disc store continues to rotate into the next Q disc revolution, until it reaches the point at which the clock pulse early is generating the address in treatment as recorded in the address register ADR (FIG. 12) and as previously described, detection of the address coincidence results in a signal being applied, in R.T.S.(O) from the address coincidence element ADS over lead ADC to the sequencer SEQ. In the sequencer, the signal on lead ADC is applied to the logic element CPE = ADR which responds by applying a "start 2" signal, in time R.T.S.(O) over lead ST2 to start the second programme sequence, illustrated in FIG. 10.

Turning now to FIG. 10, the start signal ST2 sets the bistable TS2, which applies a signal from its 1 output to prime the logic elements appertaining to the second programme sequence, and in R.T.S.(O) restarts the counting chain SCO. Thus, position 1 of the counting chain corresponds to R.T.S.(−1), position 2, to R.T.S.(−2) and so on. In counting position 11, a binary 0 signal is applied from the logic element CRC − BRE over lead CRL (FIG. 12) to set the CRC data bit in the buffer register to binary 0 to indicate that an updating operation has occurred in respect of this metering signal lead since the last read-out as previously described. In counting position 12, a signal is applied from logic element UDR − BRE over lead MDR (FIG. 12) to cause the updating register to read its updated meter fee total over leads UBR to the buffer register, which now registers the new meter fee total. This information is also retained in UDR, for possible subsequent use, as later described. In counting position 13, the new meter check bit, applied from the general logic element GEL over lead MCB, to the sequencer logic element MCB − BRE, is now applied over lead MBC to the buffer register BRE. This meter check bit will be binary 1 if the number of ones in the binary/decimal code representation of the new meter fee total is even and will be binary 0 if this number is odd, this being determined by the general logic element GEL, in known manner. All the relevant data is now registered in the buffer register ready for return to the disc store, at the appropriate time.

The sequence counter continues its counting action to re-set the relevant storage cells in the temporary part of the disc store, and in respect of which the updating operation described above has been carried out. It will be recalled that these storage cells in the temporary part of the disc store are progressively displaced with respect to one another, the relevant storage cell of track MET1 (FIG. 5) being available for writing in R.T.S.(−17) and the respective storage cells in each of the subsequent MET tracks being displaced from the corresponding storage cell in the preceding MET track by four cell (time slot) postions. Returning to the programme sequence of FIG. 10, when the sequence counter reaches position 17, it applies a signal, in R.T.S. (−17) via the "Write 0 MET 1" logic element, over lead RES1, to the write element HET1, FIG. 5, to re-set the relevant storage cell of track MET1. However, in effecting this re-setting operation, a complication arises in that, at this moment (R.T.S.−17) a further write 1, command could have appeared from the output of gate TSG1 in respect of a further verified meter signal pulse and it is necessary to take account of this possibility. To this end, the re-set signal applied from the "Write 0 MET 1" logic element, FIG. 10, is applied to one input to gate RAG1, FIG. 5. If a write 1 command is present on the output from gate TSG1, this will be applied over lead /27 and inverter IV13, to the other input to gate RAG1, which is thereby inhibited. In this circumstance therefore the re-setting signal is ineffective and the binary 1 condition recorded in this storage cell of track MET1 will remain and will be taken into account during a subsequent updating operation by the updating apparatus. The signal on lead /27 is also applied to a lead ZC (FIG. 5), the purpose of which will be described below with reference to the third programme sequence.

As the sequence counter (FIG. 10) continues to count over positions 21, 25, 29, and so on to position 53, re-set signals are applied from the respective logic elements to the write elements HET2, HET3 and so on to HET10, FIG. 5, so that the set ones of the storage cells in the corresponding temporary storage tracks MET are re-set to their 0 condition, the corresponding storage cells in the HEC tracks being re-set during the next disc revolution as will be apparent from the "read" - "write" operations previously described.

The sequence counter continues to count, over positions 54 to 58, to position 59, corresponding to R.T.S.(−59), this being the time slot in which the respective storage cells of the semi-permanent part of the store are available for "write" operation. In position 59, the sequence counter applies a signal, via the associated logic element BRE − Disk and lead COW (FIG. 12) to the write amplifiers WAM to cause the new meter fee total, together with the CRC and MCB data bits to be written into the respective storage cells of the semi-permanent part of the store. In the manner previously described, when the sequence counter reaches its ultimate position it applies a signal via a "re-set" logic element and lead RS2 to re-set the sequence counter and the bistable TS2. The re-set logic element also applies a priming signal to a logic element CPE = ADR, so that after approximately one complete revolution of the disc store, when the address coincidence element ADS (FIG. 12) again detects coincidence between the address in treatment and the appearance of this address from the clock pulse early, a signal is applied in R.T.S.(O) to the CPE = ADR logic element of the sequencer, causing this to apply a start 3 signal over start lead ST3, to start the third programme sequence, illustrated in FIG. 11.

Referring to FIG. 11, the start signal ST3, applied in time R.T.S.(O) starts the sequence counter and sets the bistable TS3 to prime the logic elements appertaining to the third programme sequence. From the sequence counter positions 19 to 55, at four time slot intervals, the respective logic elements "check MET1," "check MET2," and so on are interrogated, to verify that the temporary store re-set operations, effected in the second programme sequence described above, have been correctly carried out. As will be recalled from the description given earlier above, during the P disc revolutions, the "write" command signals for the write elements HEC1 − HEC9, FIG. 5, are applied from position 1 of the shift registers SR4 − SR13, FIG. 6, over leads LUD1(−19), LUD2(−23), LUD3(−27) and so on. For the present checking operation, these signals are also applied over leads LCD1 − LCD10 to respective ones of the checking logic elements (FIG. 12), the latter being arranged to check that the signal condition of each of the leads LCD1 − LCD10 is binary 0. Thus, when the sequence counter reaches position 19 (R.T.S. − 19), it applies an interrogating signal to the "check MET1" logic element. However, in the case of the MET1 track, it will be recalled that the situation could arise in which a write 1 command was being applied to the write element HET1, coincident with a MET1, re-setting signal applied during the second programme sequence and that in this circumstance, the re-setting of the MET1 track was inhibited. When this condition applies, it is necessary for the check MET1 logic element in this, third, programme sequence to be conditioned to check for the presence of binary 1 on lead LCD1, instead of binary 0. To this end, the logic element shown in FIG. 11A is provided. The occurrence of a binary 1 signal on lead ZC, FIG. 5, coincident with the re-set signal RES1, FIG. 10, during the second programme sequence operates gate RAG2 (FIG. 11A) the output from which sets the bistable TS4 to its 1 condition. The 1 output from TS4 is applied over lead ZL, to condition the check MET1 logic element to check for the presence of binary 1 on lead LCD1. In the absence of a binary 1 signal on lead ZL, the check MET1 logic element is conditioned to check for the presence of binary 0 on lead LCD1. As the sequence counter (FIG. 11) continues to step over positions 23(R.T.S. − 23), 27(R.T.S. − 27) and so on, to position 55(R.T.S. − 55), the associated "check" logic elements check that the signal condition of each of the leads LCD2 − LCD10 is binary 0, thus indicating that the re-setting operations effected during the second programme sequence have been correctly executed. Should one of these checks indicate that a re-setting operation has not been correctly executed, then the relevant check element, FIG. 11, would produce an output signal, not shown, to re-set the sequence counter and to prime the CPE = ADR logic element, FIG. 9. Thus, the disc would make approximately one complete revolution, until the address coincidence is again detected, whereupon a start 2 signal would be applied over lead ST2 to cause the second programme to be repeated. Should the fault again be detected during the ensuing third programme sequence then a fault report would be initiated as previously outlined above.

Continuing with the third programme sequence, when the sequence counter reaches position 60 (R.T.S. − 60) it applies a signal via the disc − BRE logic element (FIG. 11) over lead IBR (FIG. 12) to the read amplifiers RAM to cause the data recorded at this address in the disc store during the second programme sequence, to be read-out to the buffer register BRE. The buffer register reads the meter fee total, over leads BGL to the general logic element GEL, together with the meter check bit MCB, so that this data can be compared with that originally transferred from the updating register UDR. Upon detecting data coincidence, the general logic applies a transfer check signal over lead MCC and upon verification of the new meter fee total against the received parity bit, applies a parity check signal over lead PCB, to the check data logic element, FIG. 11. When the sequence counter steps to its ultimate position 61, it interrogates the check data logic element for the presence of the check signals on lead MCC and PCB. Should these check signals not be present, then as described above, the second programme sequence would be recaptured and repeated and in the event of the fault again being detected during the ensuing third programme sequence, a fault report would be initiated. However, assuming that the check signal is detected, than a general reset signal is applied, via a general re-set logic element, to re-set the updating apparatus to normal in readiness for a further updating operation.

It will be appreciated by those skilled in the art that in carrying this proposed electronic telephone metering system into effect, much of the logic employed may be duplicated for security with automatic switch-over in the event of persistent fault detection. Such arrangements are generally well known and do not form part of the present invention. It is, of course, necessary in the design of such arrangements to ensure protection of all recorded data during any switch-over to standby apparatus.

In its basic function of subscriber telephone metering, the proposed electronic metering system requires only that the existing telephone exchange switching system present recognizable metering impulses at some discrete point for each subscriber, normally the line circuit. The system will readily cater for the highest metering speeds, for subscriber dialled international and intercontinental calls. A further application of the system is that, in addition to its normal subscriber metering use, it may readily be adapted so that a part of the storage and access apparatus may serve for traffic metering and recording either on a unit count, or time count basis. This type of information is invaluable in assessing the performance of a telephone exchange and the proposed system may be used simultaneously for subscriber metering, unit count traffic recording and equipment usage metering. As described, the basic system is capable of serving a block of 10,000 directory numbers, but an installation need not be restricted to serving one telephone exchange. Thus, other exchanges in a multi-exchange building could be served, or the apparatus could be located in dependent small exchanges and linked by remote control to a main installation, where records are maintained.

We claim:

1. In an automatic telephone system central office serving a plurality of subscribers lines, with each line terminated at said central office in a line circuit and having an identifying line number and said central office including equipment to supply periodic metering pulses for local and interoffice calls; a memory disc having a surface of magnetic material and including means for rotating said disc about its axis at a fixed rate, said disc including a first reset track and a second timing track and a plurality of meter fee recording tracks, a first counter resettable by said reset track and arranged to count in decimal code the output of said timing track, said first counter having an output corresponding to the designations of each said line number having a metering position on said disc, a pulse-plus-bias-line-gate for each said line circuit preconditioned in response to a metering pulse, said output of said first counter operative to periodically scan each said line for the presence of a preconditioned pulse-plus-bias-line-gate and to condition it to a conductive state during the interval of the counter when its count corresponds to the pulse-plus-bias-line-gates designation, a first, a second, a third and a fourth individual store for each said line in said plurality of recording tracks, said individual stores for each of said lines constituting tracks on said disc divided into sections individual to said lines, and said individual stores comprising a plurality of sections along the radius of said disc in a plurality of tracks, means operated in response to the presence of a conditioned pulse-plus-bias-gate to write a "one" in a said first metering store associated with said line, first logic means operated upon a first succeeding revolution of said disc to read said "one" for said particular line from said first individual store and the continued presence of said conditioned pulse-plus-bias-gate to write a "one" in said second individual store associated with said line, second logic means operated upon a second succeeding revolution of said disc to read said "one" for said particular line from said second individual store and the absence of said conditioned state of said pulse-plus-bias-gate to write a "one" in said third individual store associated with said line, and third logic means operated upon a third succeeding revolution of said disc to read said "one" for said particular line from said third individual store and the absence of said conditioned state of said pulse-plus-bias-gate to write a "one" in said fourth individual store associated with said line, other means operated in response to reading a "one" for a particular one of said lines in said fourth metering store to operate a temporary storage means to register the "one" for said line and subsequently into a permanent storage means to register the cumulative metering count as read from said temporary store for said line.

2. In an automatic telephone system central office as claimed in claim 1 wherein said temporary store comprises a limited plurality of tracks and including further logic means operated to record said "one" as read from said fourth track in sequentially succeeding tracks upon finding preceding tracks having a "one" recorded therein.

3. In an automatic telephone system central office as claimed in claim 2 further including a priority logic means operated upon detecting said total of "ones" recorded in said temporary store approaching the limit of said limited plurality of tracks to effect the transfer of said count to said permanent storage means.

* * * * *